United States Patent [19]

Suzuki et al.

[11] Patent Number: 5,534,148

[45] Date of Patent: Jul. 9, 1996

[54] PROCESS FOR TREATING PHOTOGRAPHIC WASTE SOLUTION

[75] Inventors: Seiji Suzuki; Kiyotaka Hori, both of Minami Ashigara; Yusuke Shiota, Himeji; Kiichiro Mitsui, Akashi, all of Japan

[73] Assignees: Fuji Photo Film Co., Ltd., Kanagawa; Nippon Shokubai Co., Ltd., Osaka, both of Japan

[21] Appl. No.: 495,001

[22] Filed: Jun. 27, 1995

[30] Foreign Application Priority Data

Jun. 27, 1994 [JP] Japan ................................. 6-165773

[51] Int. Cl.$^6$ .............................. C02F 3/30; C02F 11/08; C02F 1/72
[52] U.S. Cl. ................. 210/605; 210/630; 210/631; 210/761; 210/762; 210/763
[58] Field of Search ....................... 210/620, 630, 210/631, 761, 762, 763, 605

[56] References Cited

U.S. PATENT DOCUMENTS 4,699,720 10/1987 Harada et al. ..................... 210/763
4,874,530 10/1989 Kobayashi et al. .................. 210/763
5,405,532 4/1995 Loew et al. ........................ 210/763

FOREIGN PATENT DOCUMENTS 5-119440 5/1993 Japan.

*Primary Examiner*—Neil M. McCarthy
*Attorney, Agent, or Firm*—Birch, Stewart, Kolasch & Birch

[57] ABSTRACT

A process for purifying a photographic waste solution is disclosed. The photographic waste solution is purified by successively performing: noncatalytic wet oxidation at a temperature of from 140° C. up to 370° C. under such a pressure as to hold said waste solution in a liquid phase while supplying an oxygen-containing gas thereto; solid-liquid separation of the solid matters and/or suspended matters thus formed; catalytic wet oxidation at a temperature of from 140° C. up to 370° C. under such a pressure as to hold said waste solution in a liquid phase while supplying an oxygen-containing gas thereto; and a biological treatment comprising a combination of an aerobic biological treatment with an anaerobic biological treatment.

13 Claims, 5 Drawing Sheets

PROCESS FOR TREATING PHOTOGRAPHIC WASTE SOLUTION

FIELD OF THE INVENTION

The present invention relates to a process for purifying a photographic waste solution. More particularly, it relates to a process for treating a photographic waste solution which has a high chemical oxygen demand (hereinafter also referred to simply as COD) and contains compounds of silver, iron, aluminum, phosphorus, halogens, nitrogen, etc.

BACKGROUND OF THE INVENTION

Attempts have been made to develop purification methods whereby the COD of a photographic waste solution can be effectively reduced, those whereby nitrogen, phosphorus, etc. contained in a waste solution can be eliminated, those whereby heavy metals contained in a waste solution can be eliminated and those whereby advantages can be achieved at the same time. For example, there have been carried out or proposed biological treatments, burning, evaporation to dryness by heating, oxidation with the use of chlorine-based chemicals, electrolytic oxidation, hydrogen peroxide/ferrous salt treatments, ozone oxidation, coagulation with the use of inorganic or organic flocculating agents, adsorption with the use of activated carbon, inorganic adsorbents or organic polymers, reverse osmosis with the use of membranes, electric dialysis and ultrafiltration.

However, each of the above-mentioned methods requires possible improvement due to the following problems. That is to say, (1) none of the biological treatments, coagulation, adsorption, electric dialysis, reverse osmosis, ultrafiltration, hydrogen peroxide/ferrous salt treatments and ozone oxidation can establish the purification at a satisfactory level, when employed alone; (2) each of the treatments such as burning, evaporation to dryness, electrolytic oxidation, ozone oxidation, adsorption, reverse osmosis, electric dialysis and ultrafiltration, requires a high treatment cost; and (3) each of the treatments such as burning, evaporation to dryness, coagulation and adsorption suffers from a problem of the formation of substances which might cause secondary pollution after the completion of the treatment.

Under these circumstances, the present invention has been completed. Accordingly, the present invention is to provide a process for purifying a photographic waste solution which makes it possible to lower the COD of the photographic waste solution to a satisfactorily low level and to eliminate nitrogen, phosphorus, heavy metals, etc. therefrom at a low cost without forming any substance causing secondary pollution or requiring troublesome procedures for the maintenance.

To solve the above-mentioned problems, the present invention provides a process for treating a photographic waste solution, which can be easily carried out and is excellent in practicality and economy, which comprises subjecting the photographic waste solution to noncatalytic wet oxidation at a temperature of from 140° C. up to 370° C. under such a pressure as to hold said waste solution in a liquid phase while supplying an oxygen-containing gas thereto; eliminating the solid matters and/or suspended matters thus formed; effecting catalytic wet oxidation at a temperature of from 140° C. up to 370° C. under such a pressure as to hold said waste solution in a liquid phase while supplying an oxygen-containing gas thereto; and further subjecting the treated solution after the catalytic wet oxidation to a biological treatment.

A hardly degradable photographic waste solution is difficult to make completely harmless within a practically available period of time and at a reasonable cost, even though noncatalytic wet oxidation is combined with catalytic wet oxidation. Moreover, there arises a problem of changes in the components. Thus the present inventors have employed a combination of a biological treatment, which is scarcely affected by the changes in the components, with the above-mentioned treatments and thus successfully provided a process for treating a photographic waste solution which is excellent in practicality and economy.

SUMMARY OF THE INVENTION

In accordance with the present invention, an advanced processing has been established for the first time not by merely combining the above-mentioned steps but by achieving the optimum conditions for each step.

The present invention is specified as follows.

(1) A process for treating a photographic waste solution characterized in that a photographic waste solution is purified by successively performing the following steps:

(i) a first step of subjecting the photographic waste solution to noncatalytic wet oxidation at a temperature of from 140° C. up to 370° C. under such a pressure as to hold said waste solution in a liquid phase while supplying an oxygen-containing gas thereto;

(ii) a second step of eliminating the solid matters and/or suspended matters formed in the first step from the treated solution of the first step;

(iii) a third step of subjecting the treated solution of the second step to catalytic wet oxidation at a temperature of from 140° C. up to 370° C. under such a pressure as to hold said waste solution in a liquid phase while supplying an oxygen-containing gas thereto; and (iv) a fourth step of subjecting the treated solution of the third step to a biological treatment comprising a combination of an aerobic biological treatment with an anaerobic biological treatment.

(2) A process for treating a photographic waste solution as described in the above (1), wherein, in the third step, an adsorbent is provided before effecting the catalytic wet oxidation and adsorption is effected with the use of said adsorbent followed by the catalytic wet oxidation.

(3) A process for treating a photographic waste solution as described in the above (1) or (2), wherein, in the fourth step, the anaerobic biological treatment is first effected and then the aerobic biological treatment is effected.

(4) A process for treating a photographic waste solution as described in the above (3), wherein the aerobic biological treatment following the anaerobic biological treatment is effected in the presence of activated carbon.

(5) A process for treating a photographic waste solution as described in the above (3) or (4), wherein an aerobic biological treatment is effected before said anaerobic biological treatment.

(6) A process for treating a photographic waste solution as described in any of the above (3), (4) and (5), wherein the aerobic biological treatment following the anaerobic biological treatment comprises (a) an aerobic biological treatment which is effected without using any activated carbon and (b) another aerobic biological treatment which is effected in the presence of activated carbon.

In the embodiment of the present invention, it is preferable to carry out under the following conditions.

(7) The pH value of the treated solution of the first step ranges from 4 to 10.

(8) The pH value of the treated solution of the third step ranges from 4 to 8.

(9) In the third step, the oxygen-containing gas is supplied in an amount 0.5 to 3 times more than the amount of oxygen theoretically required for completely degrading the inorganic and organic matters contained in the waste solution into water, carbon dioxide, nitrogen gas and inorganic matters.

(10) In the third step, the adsorbent provided upstream in the catalyst tower is made of titanium, zirconium and iron oxides.

(11) The anaerobic biological treatment is effected at a pH value of from 7 to 9.

Figure 1:
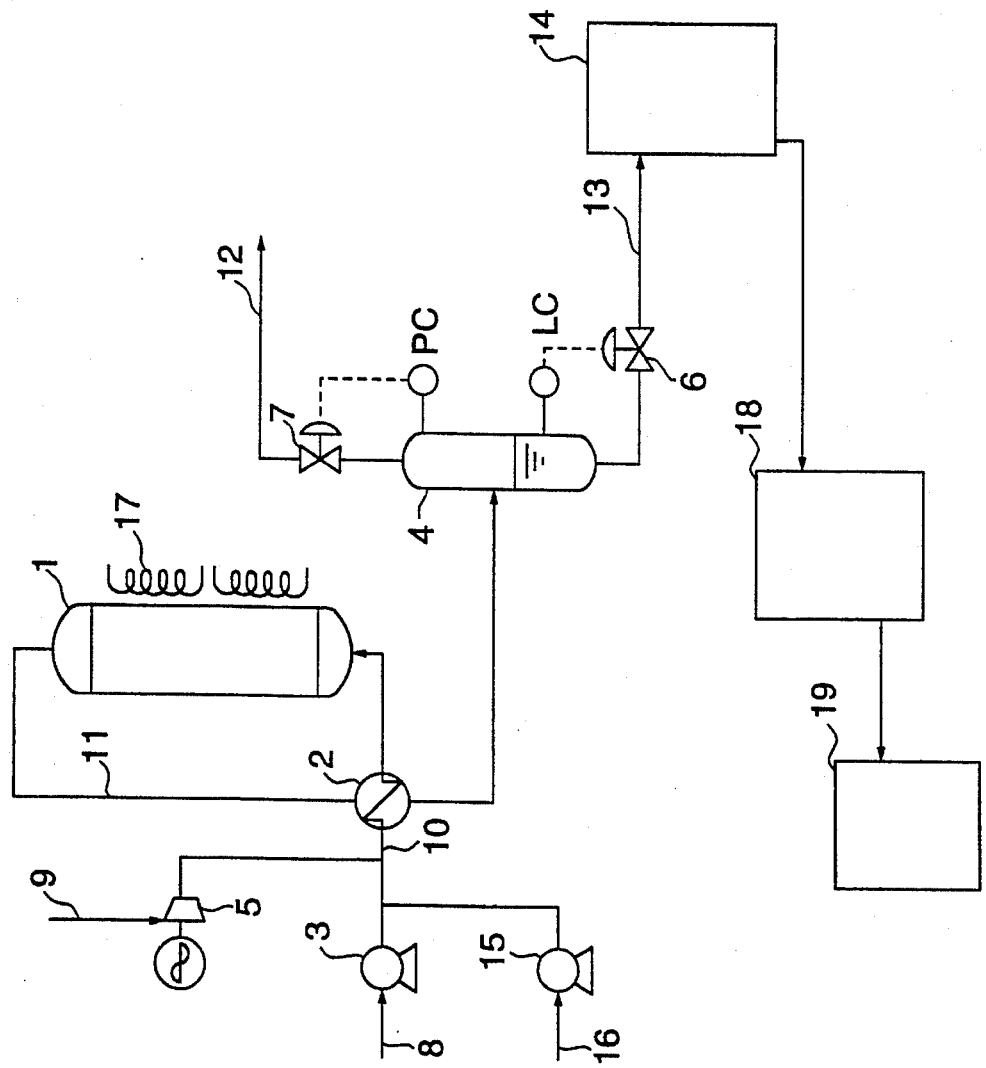
FIG. 1 shows an example of the embodiment of the treatment apparatus to be used in the first step and the second step of the present invention.

In these figures the following numerical symbols are used:

1. noncatalytic wet oxidation tower
2. heat exchanger
3. waste solution-supply pump
4. gas-liquid separator
5. compressor
6. liquid face control valve
7. pressure control valve
8. waste solution-supply line
9. oxygen-containing gas-supply line
10. gas-liquid mixture-supply line
11. treated solution line
12. gas-exhaust line
13. treated solution-exhaust line
14. first step treated solution tank
15. alkali-supply pump
16. alkali-supply line
17. electric heater
18. solid-liquid separator
19. second step treated solution tank
21. catalytic wet oxidation tower
22. heat exchanger
23. second step treated solution-supply pump
24. gas-liquid separator
25. compressor
26. liquid face control valve
27. pressure control valve
28. second step treated solution-supply line
29. oxygen-containing gas-supply line
30. gas-liquid mixture-supply line
31. treated solution line
32. gas-exhaust line
33. treated solution-exhaust line
34. third step treated solution tank
35. alkali-supply pump
36. alkali-supply line
37. electric heater
38. adsorption tower (or noncatalytic wet oxidation tower)
39. alkali-supply pump
40. alkali-supply line
41. valve
51. raw solution for biological treatment
52. biological filtration tower
53. biological filtration tower
54. blower (compressor)
55. air diffuse pipe
56. biological treatment tank
57. biological filtration tower
58. biological treatment tower
59. treated solution from biological treatment tower 58

DETAILED DESCRIPTION OF THE INVENTION

The present invention resides in that a photographic waste solution is treated by performing the above-mentioned steps (1)(i) to (1)(iv) successively. These steps (i) to (iv) are preferably performed successively and continuously.

The term "photographic waste solution" as used herein means those resulting from processing materials of color and black-and-white silver halide photosensitive materials. In order to recover silver which is a valuable metal, these waste solutions are usually classified into those containing a large amount of silver eluted from the sensitive materials (i.e., a silver-containing type) and others (i.e., a silver-free type) followed by the recovery.

Silver is recovered from the silver-containing waste solution by collectors.

In general, waste solutions from fixing treatment, bleaching treatment in the processing of color photosensitive materials and single bath bleach-fixing treatment falls within the category of the silver-containing waste solution, while those from development treatment fall within the category of the silver-free waste solution. On the other hand, waste solutions from water washing treatment and stabilization treatment fall within the category of either the silver-containing or the silver-free waste solution depending on a concentration of silver ion contained therein.

In addition to these photographic waste solutions, the present invention is applicable to the treatment of a waste solution contaminated with a waste from the development of presensitive plate (PS) for off-set printing (photosensitive lithography).

Each step will be described in detail below.

In the first step according to the present invention, a photographic waste solution is subjected to noncatalytic wet oxidation at a temperature of from 140° C. up to 370° C. under such a pressure as to hold said waste solution in a liquid phase while supplying an oxygen-containing gas thereto.

The photographic waste solution to be used in the present invention frequently contains aluminum, phosphorus, silicon, calcium, magnesium, etc. Compounds of these elements are harmful to the catalytic wet oxidation and will be also referred to as "harmful matters" hereinafter. Such compounds contained in a waste solution cause clogging of a process line in, for example, a catalyst layer and deterioration of the catalyst in the catalytic wet oxidation. Therefore a photographic waste solution containing these harmful matters sometimes cannot be completely treated by the catalytic wet oxidation method, which often brings about undesirable results.

Moreover, the photographic waste solution frequently contains heavy metal components such as iron and silver. Compounds of these elements also cause clogging of a line in, for example, a catalyst layer and deterioration of the catalyst in the catalytic wet oxidation. Therefore the catalytic wet oxidation sometimes cannot be completely performed, which often brings about undesirable results.

The photographic waste solution also contains halogen components which sometimes inhibit the catalytic wet oxidation to thereby bring about undesirable results. Accordingly, these harmful matters and heavy metals are required to be eliminated from the waste water prior to the catalytic wet oxidation, if possible. In the present invention, the major objects of the first step and the subsequent second steps are to eliminate these substances from the above-mentioned photographic waste solution. However, halogens are impossible to be effectively eliminated from the photographic waste solution.

By the catalytic wet oxidation of the first step as described above, harmful matters such as aluminum, phosphorus, silicon, calcium and magnesium and heavy metals such as silver and iron, are converted into oxides, hydroxides, inorganic salts, etc., which are insoluble or hardly soluble in water, to thereby form solid matters and/or suspended matters. Also, silver, aluminum, phosphorus, silicon, etc. contained in the above-mentioned waste solution are converted into compounds which are insoluble or hardly soluble in water and adsorbed by insoluble or hardly soluble iron compounds precipitated at the same time, thus forming solid matters or suspended matters. Then these solid matters and suspended matters in the treated solution of the first step are eliminated from the solution by solid-liquid separation (the second step). Thus the harmful matters and heavy metals can be eliminated.

Accordingly it often brings about desirable results that the above-mentioned waste solution contains, in particular, iron compounds.

On the contrary, when the heavy metals and harmful matters to be eliminated from a photographic waste solution cannot be fully eliminated because of the insufficient content of iron in the photographic waste solution, the existence of heavy metals other than the above-mentioned harmful matters and iron in the photographic waste solution or some other reasons, then it is appropriate to preliminarily add, for example, an iron compound, which is soluble in the photographic waste solution, prior to the noncatalytic wet oxidation to thereby elevate the iron concentration.

The iron compound to be added in such a case is not particularly restricted, so long as it is soluble in the photographic waste solution. Examples thereof include ferrous sulfate, ferric sulfate, ferrous nitrate, ferrous chloride and iron-EDTA complex.

The above-mentioned iron compound may be added at any ratio without restriction, so long as the concentration of water-soluble or water-suspendable iron compound(s) in the photographic waste solution is increased to at least 100 mg (in terms of the weight of iron) per liter of the waste solution. The iron compound is preferable to be added in such an amount as to give an iron concentration of from 300 mg/l to 100 g/l, still preferably from 500 mg/l to 50 g/l. When the iron concentration exceeds 100 g/l, the solubility of the oxygen-containing gas in the waste solution is lowered and thus the reaction is suppressed. Under the circumstances, there arises another problem, i.e., an increase in the solid matters for the post-treatment. When the iron concentration is less than 100 mg/l, on the other hand, no satisfactory effect can be achieved.

In the first step, other contaminants (for example, organic matters, inorganic COD components) in the photographic waste solution are simultaneously oxidized and degraded into organic matters of lower molecular weight, inorganic salts, carbon dioxide, water, ash, etc. and thus the COD components in the above-mentioned photographic waste solution can be partly purified.

Accordingly, the first step of the present invention is particularly effective in eliminating heavy metals, harmful matters, etc. from the photographic waste solution. In the photographic waste solution, heavy metals and harmful matters are dissolved in the form of, for example, chelate complexes. By the treatment of the first step, organic matters including chelating agents are degraded and heavy metals and harmful matters are liberated in the form of ions. As a result, the heavy metals and harmful matters are converted into compounds insoluble or sparingly soluble in water and thus easily precipitated, which facilitates the elimination thereof.

The noncatalytic wet oxidation of the present invention is performed at a temperature of from 140° C. up to 370° C., preferably from 180° C. up to 300° C. and still preferably from 230° C. up to 280° C.

When the treating temperature is 370° C. or above, it is impossible to hold the waste solution in a liquid phase. When the treating temperature is lower than 140° C., the organic matters in the waste solution can be hardly degraded, which makes it difficult to insolubilize chelated harmful matters and heavy metals almost completely. When the treating temperature exceeds 300° C. or 280° C., a higher treating pressure is needed, which is disadvantageous from the viewpoint of the equipment and running costs. When the treating temperature is lower than 180° C. or 230° C., a longer treating time is needed in order to almost completely insolubilize the chelated harmful matters and heavy metals, which is also disadvantageous from the viewpoint of the equipment and running costs. When the treating temperature is lower than 180° C., in particular, it is sometimes observed that the harmful matters and heavy metals cannot be completely insolubilized.

In the noncatalytic wet oxidation of the present invention, the treating pressure may be appropriately selected by taking each treating temperature into consideration so as to hold the solution in a liquid phase.

In the noncatalytic wet oxidation, a large amount of the photographic waste solution can be treated at a high treating temperature, whereas only a small amount of the photographic waste solution can be treated at a low treating temperature. When the treating temperature is 270° C., for example, it is effective that the space velocity falls within a range of from 0.5 hr$^{-1}$ to 5 hr$^{-1}$. A space velocity less than 0.5 hr$^{-1}$ is not preferable, since only a reduced amount of the photographic waste solution can be treated, a large equipment is required and the reaction efficiency exceeds the upper limit of the appropriate range. Also, a space velocity exceeding 5 hr$^{-1}$ is not preferable for eliminating the harmful matters and heavy metals, since the treatment efficiency is lowered.

When the efficiency of treating the COD components is unnecessarily elevated in the noncatalytic wet oxidation of the first step, the heat source for maintaining the treating temperature and ensuring the self sustaining in the catalytic wet oxidation apparatus of the third step becomes insufficient. Accordingly, it is preferable to regulate the COD treatment efficiency in the noncatalytic wet oxidation to such a level that the solid matters and suspended matters formed by the wet oxidation can be sufficiently precipitated and then eliminated after the noncatalytic wet oxidation, namely, the harmful matters and heavy metals in the photographic waste solution can be sufficiently eliminated.

The efficiency of treating the COD components is not particularly restricted but appropriately selected case by case. In general, the treatment efficiency of CODc=(oxygen demand by potassium dichromate) ranges from 20 to 80%, still effectively from 45 to 70%. Therefore the temperature, pressure and space velocity for this treatment may be appropriately selected each within the range as specified above depending on the case.

The term "oxygen-containing gas" as used herein means a gas containing ozone or oxygen. When an ozone or oxygen gas is to be used, it may be diluted with, for example, an inert gas. Although air is advantageously used therefor, an oxygen-containing exhaust gas discharged from another plant may be used therefor.

In the noncatalytic wet oxidation, the gas may be supplied at an appropriate ratio depending on the concentration of the photographic waste solution. The oxygen is supplied in an amount 0.5 to 5 times, preferably 1.0 to 3 times, more than the amount theoretically required for completely degrading the COD components (organic and inorganic matters) in the photographic waste solution into water, carbon dioxide and inorganic matters. The term "inorganic matters" as used herein means those having sulfate group, ammonium, etc.

When the gas is supplied in an amount exceeding 5 times as much as the theoretically required level as specified above, oxygen is supplied in an unnecessarily large amount. When the gas is supplied in an amount less than 0.5 times as much as the theoretical level, the shortage in oxygen makes the purification step incomplete.

Oxygen in an amount 0.5 to 1.0 time more than the theoretically required level is insufficient for completely degrading the COD components in the photographic waste solution into water, carbon dioxide and inorganic matters. Such an amount of oxygen is selected when the COD treatment efficiency should be regulated to a low level so as to leave an appropriate amount of the COD components in the treated solution for maintaining the treating temperature in the subsequent step of catalytic wet oxidation.

It is effective that the photographic waste solution of the present invention contains $COD_{Cr}$ at a concentration of from 1 to 200 g/l, still effectively from 10 to 100 g/G. When the $COD_{Cr}$ concentration exceeds 200 g/l, the extremely large oxidation heat of the COD components makes it difficult to control the treating process. At a $COD_{Cr}$ concentration exceeding 100 g/l, the large oxidation heat of the COD components often requires a cooling system, etc., thus elevating the cost.

When the $COD_{Cr}$ concentration is less than 1 g/l, on the other hand, the almost whole heat required for elevating the temperature should be supplied from a heat supplier. Under the circumstances, the advantages of the process for treating a photographic waste solution of the present invention can be scarcely achieved and the processing may be carried out with the use of the conventional techniques. At a $COD_{Cr}$ concentration less than 10 g/l, the oxidation heat of the COD components is small, which often makes the self sustaining of the wet oxidation process difficult, even though the heat is recovered by a heat exchanger attached to the system. Therefore, the wet oxidation per se can be effected without any trouble but an additional heat supplier becomes necessary, which brings about a relative disadvantage from the viewpoint of the energy consumption.

However, a photographic waste solution conventionally contains from 40 to 90 g/l of $COD_{Cr}$ and thus it is often unnecessary to use such a cooling system or heat supplier as those described above.

In the noncatalytic wet oxidation of the first step of the present invention, the photographic waste solution may be diluted with water, though the present invention is not restricted thereto. This is because a photographic waste solution sometimes contains salts at a high concentration and thus the dilution of the photographic waste solution causes a considerable increase in the wet oxidation efficiency, thus contributing to the improvement in the purification and a decrease in the treating cost in some cases.

The method for the dilution is not particularly restricted. Namely, the photographic waste solution may be preliminarily diluted in, for example, a tank or may be diluted by continuously feeding water to the apparatus for the noncatalytic wet oxidation while performing the noncatalytic wet oxidation.

In the present invention, the salt concentration of the photographic waste solution is preferably regulated to 5 to 15% by weight, still effectively 7 to 12% by weight.

The photographic waste solution is not preferably diluted to give a salt concentration of less than 5% by weight, since an excessively large equipment is required. When the salt concentration exceeds 15% by weight, on the other hand, little improvement in the treatment efficiency can be achieved by the dilution and only a low treatment efficiency is achieved in the noncatalytic wet oxidation. Furthermore, a larger amount of scales are formed in the noncatalytic wet oxidation apparatus.

To dilute the photographic waste solution is also effective under the condition where the salt concentration is not so high (i.e., within the range as specified above) but the $COD_{Cr}$ concentration is high. Namely, the photographic waste solution is effectively diluted, when the photographic waste solution contains $COD_{Cr}$ at a high concentration and the noncatalytic wet oxidation apparatus should be provided with a cooling system or the noncatalytic wet oxidation is to be performed at a low temperature.

For the dilution, use can be made of a waste water discharged from another processing plant as a substitute for the water, without restriction.

The term "noncatalytic wet oxidation" as used herein is not particularly restricted but means wet oxidation without using any catalyst, namely, one performed in a wet oxidation tower which is not packed with such a catalyst as used in the third step. In general, it means a treatment with the use of an empty reaction tower for wet oxidation.

The wet oxidation tower to be used in the noncatalytic wet oxidation of the first step of the present invention may be either type of single-pipe or multi-pipe without restriction.

The wet oxidation tower is also possible to be packed with a metallic or ceramic packing or to provide gas diffusion plates therein so as to improve the diffusion of the solution and the gas. In the noncatalytic wet oxidation of the first step, it is still effective to use a wet oxidation tower of the single-pipe type having gas diffusion plate provided therein.

A wet oxidation tower of the multi-pipe type costs higher than the one of the single-pipe type. Moreover, a wet oxidation of the single-pipe type, which is scaleless, is preferred, since scales are liable to be formed in this reactor due to insolubilizing harmful matters and heavy metals. Accordingly, it is desirable to provide gas diffusing plates so as to effectively transport the solid matters and/or suspended matters thus insolubilized together with the solution and the gas. The installation of the gas diffusing plates is also preferable from the viewpoint of improving in the treatment efficiency of the noncatalytic wet oxidation. These gas diffusing plates are not particularly restricted in terms of shape, number, etc.

The apparatus for the first step may be composed of facilities (wet oxidation tower, heat exchanger, etc.) each employed alone. Alternatively, the apparatus may be composed of facilities each employed in combination. In the latter case, each of the facilities may be arbitrarily operated on or off depending on, for example, the amount of the waste solution to be treated, washing and inspection of the facilities. From the viewpoint of operation, it is effective to use two or more noncatalytic wet oxidation towers and/or heat exchangers for the alternate operation, since the treatment of the waste solution and the washing-off of scales are often carried out alternately. However the present invention is not restricted thereto.

Materials for the wet oxidation towers, heat exchangers and other parts may be arbitrarily used without restriction. Examples of the materials include titanium, titanium/palladium and stainless steel.

In the first step of the present invention, the pH value may be regulated so as to appropriately establish the treatment by adding a pH control agent which may be added either before the first step or continuously during the noncatalytic wet oxidation. It is effective to continuously add the pH control agent during the noncatalytic wet oxidation, though the present invention is not restricted thereto. Since a photographic waste solution generally contains a large amount of thiosulfates, the pH value becomes largely lowered after the completion of the noncatalytic wet oxidation. Therefore, an alkali is added to neutralize sulfuric acid which has been formed by the oxidation and degradation of the thiosulfuric acid. When an alkali is preliminarily added to the photographic waste solution, which also generally contains a large amount of ammonium ion, the pH value of the photographic waste solution is elevated and thus there arises a problem due to the vaporization of ammonia.

The pH control agent is not particularly restricted but selected from, for example, sodium hydroxide, potassium hydroxide, sodium carbonate and aqueous solutions thereof. The amount of the alkali to be added in the first step is not particularly restricted but adjusted in such a manner as to control the pH value after the completion of the first step.

After the completion of the treatment of the first step, the pH value preferably falls within a range of from 4 to 10, still preferably from 6 to 8.5. When the pH value is lower than 4, the corrosion resistance of the apparatus is deteriorated and the efficiency for eliminating the heavy metals and harmful matters is lowered.

When the pH value exceeds 10, there arises a problem that a large amount of ammonia is vaporized from the treated solution. The first step, furthermore, the ratio of the conversion of the harmful matters, such as aluminum, silicon and phosphorus, into the solid matters or suspended matters is lowered, which results in a decrease in the efficiency for eliminating these matters after the completion of the second step.

When the concentrations of the heavy metals and harmful matters to be eliminated are not sufficiently reduced after the noncatalytic wet oxidation (i.e., the first step) or the solid-liquid separation (i.e., the second step), these heavy metals and harmful matters may be further eliminated by employing purification methods, for example, adsorption with the use of activated carbon, inorganic adsorbents or organic polymers; electric dialysis with the use of a membrane; and addition of chemicals, by which the substances to be eliminated are insolubilized and eliminated.

These treatments may be performed either before or after the first step and either before or after the second step. It is particularly effective to add the above-mentioned chemicals before or after the first step and before the second step. It is also effective to perform the adsorption either before the first step or after the second step. However, the present invention is not restricted thereto. It is also possible to combine these treatments with each other and the present invention is not restricted thereto.

In the present invention, subsequently, the second step is performed in order to separate and eliminate the solid matters and/or suspended matters formed in the first step from the treated solution of the first step.

The treatment in the second step may be effected by subjecting the treated solution of the first step to pressure release followed by the solid-liquid separation. Alternatively, the pressure is not released but maintained at the elevated level and the solid-liquid separation may be effected. The present invention is restricted to neither. When the solid matters and/or suspended matters are those which can be relatively easily separated while maintaining the pressure at a high level, it is economically advantageous to eliminate them without releasing the pressure (i.e., the latter approach). However, the solid-liquid separation is generally performed after releasing the pressure (i.e., the former approach) because of the difficulties in the operation.

The solid-liquid separator to be used in the second step may be selected from various ways such as precipitation, centrifugation and filtration separators. It is preferable to select one, to which a filtration aid can be added for improving the filtration performance or cake-peeling off performance and a filtration separator is still preferable. Such a filtration separator may be selected from those to be used under elevated or reduced pressure, etc.

It is preferable to use a filtration separator to be used under elevated pressure by which a high treatment efficiency can be achieved, though the present invention is not restricted thereto. Examples of the filtration separator include leaf filter type, shake filter type, aspiration filter type and filter press type. The filter press type is preferable.

The filter cloth to be used in the above-mentioned filtration may be appropriately selected from various porous fabrics such as nylon, polyester, polypropylene, acrylic resins, saran®, fluorocarbon, rayon®, glass fiber felt, wire mesh, etc. by taking the operation temperature and pressure into consideration.

Precoating or body feeding with the use of a filtration aid is also preferable depending on the particle size and the filtration performance of the filter cloth employed.

By these treatments, the content of the solid matters and/or suspended matters in the treated solution after the second step is suppressed preferably to 10 mg/l or less, still preferably to 1 mg/l or less.

As the filtration aid, use can be made of, for example, diatomaceous earth, organic fibers such as cellulose fibers, activated carbon, zeolite and mixtures thereof. Diatomaceous earth or zeolite therefor is preferable, though the present invention is not restricted thereto.

Diatomaceous earth is excellent in economics and the capability of improving the filtration performance. On the other hand, zeolite, which is capable of exchanging cation, is excellent because of making it possible to further eliminate cationic harmful matters and heavy metals through ion exchange, which can be neither insolubilized nor eliminated after the first step.

Although these filtration aids may have an arbitrary particle size without restriction, the filtration aids having an average particle size of 2 μm or above, still effectively from 5 to 40 μm are particularly effective. A filtration aid having an average particle size less than 2 μm is troublesome in the filtration performance, peeling-off of the cake, etc. Also, there is a risk that such a filtration aid is not separated by the solid-liquid separation but invades into the filtrate. On the other hand, a filtration aid having an average particle size exceeding 40 μm is less effective in the filtration performance, peeling-off of the cake, etc.

If necessary, a flocculating agent may be added to elevate the treating speed or the separation efficiency.

As the flocculating agent and the flocculating aid, use can be made of various known ones without restriction.

As the flocculating agent, an organic polymer flocculating agent is preferable. Use of a water-soluble inorganic flocculating agent is sometimes restricted, since it might cause catalysis poisoning in the subsequent catalytic wet oxidation step.

As the flocculating aid, use can be made of various conventional ones without restriction, similar to the flocculating agent, in which an organic one or a water-insoluble inorganic flocculating acid is preferable. Use of a water-soluble inorganic flocculating aid is sometimes restricted, since the catalysis poisoning in the catalytic wet oxidation of the third step may be caused.

In the second step of the present invention, the pH value is appropriately controlled so as to establish a pH value appropriate for the treatment.

Similar to the first step, the pH value is preferably controlled to from 4 to 10, still preferably from 6 to 8.5, though the present invention is not restricted thereto.

The pH control agent may be arbitrarily selected from, for example, sodium hydroxide, potassium hydroxide, sodium carbonate, sulfuric acid and aqueous solutions thereof, though the present invention is not restricted thereto.

In the third step of the present invention, the treated solution of the second step is subjected to wet oxidation with the use of a catalyst at a temperature of from 140° C. up to 370° C. under such a pressure as to hold said waste solution in a liquid phase while supplying an oxygen-containing gas.

In the present invention, the treatments of the first step and the second step are performed before the catalytic wet oxidation of the third step for sufficiently treating the COD components. Thus, the catalytic wet oxidation apparatus can be avoided to be suffered from clogging or deteriorating the catalyst due to the adsorption of heavy metals or the formation of scales, which makes it possible to achieve a high treatment efficiency in the third step without causing any problem of the purification in the catalytic wet oxidation.

The catalytic wet oxidation in the third step makes the waste solution highly pure. In the treated solution, thus obtained, the COD components, etc. are considerably reduced and the remaining COD components have been converted into substances which can be easily degraded by the biological treatment employed thereafter. Moreover, nitrogen components mainly comprising ammonia have been almost completely degraded.

The catalytic wet oxidation according to the present invention will be described in detail.

The treating temperature ranges from 140° C. up to 370° C., preferably from 180° C. up to 300° C. and still preferably from 230° C. up to 280° C.

When the treating temperature is 370° C. or above, it is impossible to hold the solution in a liquid phase. When the treating temperature is lower than 140° C., the COD components, etc. in the waste solution can be hardly degraded. When the treating temperature exceeds 300° C. or 280° C., an extremely high treating pressure is needed, which is disadvantageous from the viewpoint of the apparatus and running costs. When the treating temperature is lower than 180° C. or 230° C., the efficiency of treating the COD components in the solution is lowered. To obtain a highly pure treated solution, a longer treating time is required at the lower treating temperature. This is generally disadvantageous from the viewpoint of the running cost. Moreover, a large apparatus is required, which brings about an additional disadvantage in the cost.

When the treating temperature is lower than 180° C., in particular, a large amount of the COD components remain in the waste solution, which results in an increase in the load in the biological treatment of the fourth step following the third step in the present invention. Consequently, the total purification system becomes economically disadvantageous.

In the third step, the treated solution from the second step is generally introduced directly into the catalytic wet oxidation apparatus in the third step and treated therein. Alternatively, it is possible to separately treat a treated solution in an appropriate manner followed by the introduction into the catalytic wet oxidation apparatus, by considering the concentration of the treated solution, location of the apparatus, purification plants, etc. In the treated solution of a high concentration, for example, the treated solution may be diluted with water prior to the catalytic wet oxidation.

In particular, when the treated solution of the second step having a low COD component concentration is treated in the third step, the treated solution should be unnecessarily heated. In such a solution, the COD components may be preliminarily added to the solution.

As the COD component-containing solution to be added to the treated solution of the second step, it is preferable, from the viewpoints of cost and environment, to use a waste solution free from any harmful matters or heavy metals. Thus the COD component concentration of the waste solution can be elevated so that the catalytic wet oxidation may be performed efficiently.

When the treated solution of the second step is diluted with water, the treated solution may be preliminarily diluted in, for example, a tank. Alternatively, the treated solution may be diluted by continuously feeding water to the apparatus for the catalytic wet oxidation while performing the catalytic wet oxidation. When a treated solution from, for example, an adjacent other plant can be easily used, it is also possible to feed said treated solution into the catalytic wet oxidation apparatus. Namely, the dilution method is not particularly restricted.

Also, the COD component-containing solution may be added to the treated solution of the second step by an arbitrary method without restriction. Namely, the COD component-containing solution may be preliminarily added to the treated solution in, for example, a tank or separately fed into the catalytic wet oxidation apparatus while performing the catalytic wet oxidation.

In the catalytic wet oxidation, the treating pressure may be appropriately selected, by taking the relation to each treating temperature into consideration, so as to hold the solution in a liquid phase.

Similar to the noncatalytic wet oxidation, a larger amount of the treated solution from the second step can be treated at the higher treating temperature in the catalytic wet oxidation. On the contrary, only a small amount of the treated solution can be treated at a low temperature.

In general, the space velocity ranges from 0.1 $hr^{-1}$ to 5 $hr^{-1}$, preferably from 0.5 $hr^{-1}$ to 3 $hr^{-1}$. When the space velocity exceeds 5 $hr^{-1}$, the treatment efficiency is lowered. On the other hand, a space velocity lower than 0.1 $hr^{-1}$ causes a decrease in the amount of the treated solution and requires an excessively large apparatus.

In the catalytic wet oxidation, the oxygen-containing gas is supplied in an amount 0.5 to 3 times, preferably 1.0 to 2 times, more than the amount of the oxygen theoretically required for completely converting the COD components and ammonia into water, carbon dioxide gas, nitrogen gas, inorganic matters, etc. When the oxygen-containing gas is supplied in an amount more than 3 times as much as the theoretical oxygen level, the oxygen is used in an unnecessarily large amount. When the oxygen-containing gas is supplied in an amount less than 0.5 times as much as the theoretical oxygen level, the shortage in oxygen makes the purification incomplete.

Oxygen in an amount 0.5 to 1.0 time more than the theoretical level is insufficient for completely degrading the organic and inorganic matters into water, carbon dioxide, nitrogen gas, inorganic matters etc. However, the supplied oxygen frequently remains unused, since the efficiency of the COD treatment is generally less than 100%. In such a case, the COD treatment efficiency suffers from little change even though oxygen is supplied in an amount less than 1.0 times under considering the practical treatment efficiency. Thus it is possible to supply oxygen in an amount 0.5 to 1.0 time as much.

A source of the oxygen-containing gas to be used in the third step is not particularly restricted, so long as the gas contains oxygen. For example, air or an exhaust gas from another plant may be used therefor.

Also, the oxygen-containing exhaust gas obtained from the first step may be used. Although the oxygen content in the gas sometimes exceeds 3 times as much as the theoretical oxygen level required for completely converting the COD components and ammonia in the third step into water, carbon dioxide, nitrogen gas, inorganic matters, etc., the load of the compressor can be reduced, which brings about an economical advantage.

The "catalyst" as used herein is not particularly restricted but arbitrarily selected, so long as it is a solid catalyst capable of sustaining catalytic activity and durability under the conditions for the liquid phase oxidation. A catalyst mainly consisting of materials selected from titanium, iron, zirconium, manganese, cobalt, nickel, tungsten, copper, cerium, silver, platinum, palladium, rhodium, gold, iridium, ruthenium, etc. is preferable.

Also, the catalyst may be in various forms without restriction. For example, use can be made of catalysts of various forms including pellets, granules, spheres, rings or integrated (e.g., honeycomb) structures.

In the present invention, an adsorption tower packed with an inorganic adsorbent may be provided before the catalytic wet oxidation tower (i.e., as a pre-stage of the third step). By passing the treated solution of the second step through the adsorption tower packed with the adsorbent, the heavy metals and harmful matters, which have not been completely eliminated in the second step, are adsorbed and eliminated to thereby further prevent catalysis poisoning, etc. due to the heavy metal and harmful matter.

Preferable examples of the adsorbent to be used herein include oxides of titanium, zirconium and iron, though the present invention is not restricted thereto.

The term "oxides" of elements involves the oxide of each element, mixtures thereof and composite oxides of elements appropriately selected.

The adsorbent may be in various forms without restriction. For example, use can be made of adsorbents of various forms including pellets, granules, spheres, rings or integrated (e.g., honeycomb) structures.

The adsorption of the treated solution of the second step by the inorganic adsorbent, which is employed as the pre-stage of the third step in the present invention, may be effected under arbitrary conditions without restriction, so long as it serves as the pre-stage of the catalytic wet oxidation in the third step. For example, the adsorption may be effected at a temperature of from 140° C. up to 370° C. under such a pressure as to hold said waste solution in a liquid phase while supplying an oxygen-containing gas thereto, similar to the catalytic wet oxidation. Alternatively, the adsorption may be carried out at a temperature lower than 140° C. under such a pressure as to hold said waste solution in a liquid phase.

When the treated solution of the second step contains compounds, which have been formed by the heavy metals and harmful matters with organic matters and dissolved therein, however, only a poor elimination efficiency can be achieved merely by adsorbing these contaminants by the adsorbent. Thus, the adsorption should be carried out while degrading the organic matters formed with the heavy metals and harmful matters. The adsorption is more effective to be carried out while effecting the wet oxidation at a temperature of from 140° C. up to 370° C. under the pressure to hold said waste solution in a liquid phase, while supplying an oxygen-containing gas thereto.

In this process, the treatments may be carried out in the adsorption tower packed with the adsorbent or the catalytic wet oxidation tower packed with a solid catalyst in a series of continuous operations. Alternatively, each of these treatments may be carried out independently. These treatments in series are more effective in continuous operations, by considering the workability, etc.

To further elevate the efficiency, the adsorption under almost the same conditions as those employed in the catalytic wet oxidation in the present invention is preferable. That is to say, the adsorption is effected at a temperature of from 140° C. up to 370° C., preferably from 180° C. up to 300° C. (i.e., at almost the same level as the inlet temperature of the catalytic wet oxidation tower), under such a pressure as to hold said waste solution in a liquid phase (i.e., at almost the same level as the pressure employed in the catalytic wet oxidation) while supplying an oxygen-containing gas thereto.

However an adsorbent is often washed with a cleaning solution.

When the adsorbent to be used herein is washed, the adsorption tower or the wet oxidation tower packed with the adsorbent is preferably separated from the catalytic wet oxidation tower packed with the solid catalyst to thereby prevent the catalyst from washing.

The source of the oxygen-containing gas is not particularly restricted, so long as the gas contains oxygen. For example, air or an exhaust gas from another plant may be used therefor.

When a treatment with the use of an adsorbent is effected as the pre-stage of the third step, the oxygen-containing gas to be used in the present invention may be passed through the adsorption tower packed with the adsorbent and then supplied into the catalytic wet oxidation tower. Alternatively, another oxygen-containing gas may be supplied into the catalytic wet oxidation tower separately. An additional oxygen-containing gas may be mixed with the gas from the adsorption tower and the resulting mixed gas is supplied to the catalytic wet oxidation tower. The present invention is not restricted thereto.

The treatment towers used in the third step (i.e., catalytic wet oxidation tower, adsorption tower, etc.) may be either in the single-pipe or multi-pipe type. Also, these treatments can be performed by employing the single-pipe type and the multi-pipe type either singly or in combination depending on the components contained in the treated solution and the contents thereof without restriction.

The apparatus for the third step may be composed of facilities (catalytic wet oxidation tower, adsorption tower, heat exchanger, etc.) each employed alone. Alternatively, it may be composed of facilities each employed in a plural number without restriction.

In the latter case, each of the facilities may be arbitrarily turned on or off depending on, for example, the amount of the solution to be treated, washing and inspection of the facilities.

From the viewpoint of operation, two or more adsorption towers are effectively used for the alternate operation, since the treatment of the waste solution and the washing of the adsorption tower are often carried out alternately.

These catalytic wet oxidation towers, adsorption towers, heat exchangers and other parts may be made of arbitrary materials without restriction. Examples of the materials include titanium, titanium/palladium and stainless steel.

In the adsorption of the waste solution by the adsorbent in the third step, a space velocity of the treated solution generally ranges from 0.1 $hr^{-1}$ to 10 $hr^{-1}$, preferably from 0.5 $hr^{-1}$ to 5 $hr^{-1}$. When the space velocity exceeds 10 $hr^{-1}$, the adsorption efficiency may be lowered. On the other hand, the space velocity lower than 0.1 $hr^{-1}$ causes a decrease in the amount of the treated solution and requires an excessively large size of apparatus.

In the adsorption of the waste solution by the adsorbent, a pH value of the waste solution can be appropriately regulated.

The pH value of the waste solution may be regulated by adding, for example, sodium hydroxide, potassium hydroxide, sodium carbonate, sulfuric acid or an aqueous solution thereof, though the present invention is not restricted thereto.

Also, the pH value in this treatment is not particularly restricted but appropriately selected over a wide range, i.e., from the acidic region to the alkaline region (pH 1 to pH 14).

However, the pH value of the waste solution preferably ranges from 2 to 13.8, still effectively from 4 to 8, from the viewpoints of the solubilities of the matters to be eliminated at each pH value, the corrosion of the pipes and tanks employed in the treatment and the optimum pH value in the subsequent catalytic wet oxidation.

By taking the corrosion of the pipes and tanks employed in the treatment into consideration, the pH value of the waste solution preferably falls within the neutral to alkaline range. Therefore, the pH value is preferably 4 or above.

Since aluminum, phosphorus, silicon, etc. suffer from the deterioration in the adsorption ability at a pH value exceeding 8, it is effective that the pH value is not higher than 8.

The pH control agent to be used herein may be added by an arbitrary method without restriction. For example, it may be preliminarily added to the stock tank of the waste solution. Alternatively, it may be continuously added with the use of, for example, a feed pump to thereby control the pH value.

However, the pH value of the treated solution after the completion of the first step and the second step likely falls within a range of from 4 to 8.

In the third step of the present invention, the pH value can be similarly controlled to a level suitable for effecting the catalytic wet oxidation.

To achieve the pH value appropriate for the treatment, a pH control agent may be preliminarily added before the third step. Alternatively, the agent may be continuously added during the catalytic wet oxidation. The pH control agent is effectively and continuously added during the catalytic wet oxidation, though the present invention is not restricted thereto.

The treated solution from the second step generally contains a large amount of ammonium ion. However, the ammonium ion is treated in the catalytic wet oxidation and thus the pH value of the treated solution is considerably lowered. Therefore, an alkali is often added to the treated solution to thereby control the pH value. When an alkali is preliminarily added to the treated solution from the second step, however, the pH value of the treated solution usually exceeds 10 and thus there arises a problem of the vaporization of a large amount of ammonia. The pH control agent is therefore effectively and continuously added during the catalytic wet oxidation from this viewpoint.

The amount of the alkali to be added in the third step is not particularly restricted but appropriately controlled in such a manner as to control the pH value of the treated solution after the third step. In the third step, the pH value is effectively controlled to 4 to 8, still effectively 5.5 to 17. When the pH value is lower than 4, the corrosion resistance of the apparatus is deteriorated and, moreover, components which are hardly degraded in the biological treatment of the subsequent fourth step are liable to be formed. When the pH value exceeds 8, on the other hand, the efficiency of treating the COD and nitrogen components in the treated solution is reduced.

The pH control agent to be used herein is not particularly restricted but arbitrarily selected from, for example, sodium hydroxide, potassium hydroxide, sodium carbonate and aqueous solutions thereof.

When the process of the present invention involves the step of adsorption as described above, the alkali for the catalytic wet oxidation is preferably and continuously added to the catalytic wet oxidation tower after the adsorption.

The treated solution most suitable for the biological treatment in the fourth step can be obtained by carrying out the third step in the manner as described above.

In the fourth step, a biological treatment is effected. In the biological treatment step, the treated solution from the third step is subjected to a biological treatment comprising a combination of an aerobic biological treatment with an anaerobic biological treatment. Thus the components still remaining in the treated solution after the completion of the third step can be almost completely degraded.

A photographic waste solution is a mixture of various waste solutions discharged from color and black-and-white photographic laboratories, i.e., waste solutions from papers, negatives, X-ray films, printing films, etc. Due to changes in the amounts and composition ratios of these constituting waste solutions, a photographic waste solution widely varies in the components.

In addition, the catalytic wet oxidation in the third step is sometimes inhibited by halogens which are inherently contained in the photographic waste solution and remain undegraded therein.

As described above, the photographic waste solution is highly variable in the composition ratio and contains components inhibiting the catalytic wet oxidation. Thus the composition (i.e., the amount of the remaining organic matters, the nitrogen concentration, etc.) is also highly changeable.

Since the photographic waste solution is hardly degradable, a long treating time and a high cost are required to completely degrade the photographic waste solution by the third step. When the treating time is shortened, the amount of the components hardly degradable by the biological treatment is increased and coloration is promoted.

In order to treat the photographic waste solution at a low cost, therefore, an efficient biological treatment is required which is highly resistant against changes in the concentrations and composition of the remaining components and by which components hardly degradable biologically and coloring components can be degraded.

As the results of extensive studies, the present inventors have found out that a treatment comprising a combination of an aerobic biological treatment with an anaerobic biological treatment is effective in treating the solution treated in the third step.

The inventors have also found out that a biological treatment effected in the presence of activated carbon (hereinafter referred to as the biological activated carbon treatment) is highly effective therefor.

By effecting the biological activated carbon treatment following the third step, the components hardly degradable biologically and coloring components, which remain after the catalytic wet oxidation completed in a shortened period of time, can be degraded. Thus this treatment is effective in saving the cost by shortening the catalytic wet oxidation time.

As the biological treatment of this step, an aerobic biological treatment without using activated carbon may be carried out either alone or in combination with a biological activated carbon treatment. When these treatments are combined with each other, the biological activated carbon treatment is preferably provided at later stage, though the present invention is not restricted thereto.

When two or more biological treatments are combined with each other, they may be connected in series and successively carried out. Alternatively, the treated solution may be circulated between these treatments.

Also, these treatments may be carried out either continuously or batchwise.

When the amounts of nutritional salts (nitrogen, phosphorus, etc.) lack for the biological treatment, these salts are required to be optionally added. These salts may be added either directly to the biological treatment tank or to the influent prior to the introduction into the biological treatment tank. Nitrogen may be in any form, so long as an organism can utilize the same. Examples thereof include $(NH_4)_2SO_4$ and urea. Phosphorus may be in any form, so long as an organism can utilize thereof. Examples of the phosphorus compounds include $K_2HPO_4$, $KH_2PO_4$ and $Na_2HPO_4$. The nitrogen concentration preferably ranges from 1 to 5% of BOD, while the phosphorus concentration preferably ranges from 0.5 to 1.5%. In the biological treatment, the pH value preferably ranges from 6.0 to 9.0.

When an excessively high salt concentration might have a risk for inhibiting the growth of the organism, the solution to be treated may be optionally diluted. The salt concentration is preferably lowered to 2 to 7% by weight thereby, though the present invention is not restricted thereto.

In the biological treatment dilution may be carried out by either diluting the treated solution from the third step with water or by simultaneously adding the treated solution and water to the biological treatment tank.

When microorganisms are liable to grow in a tank where the treated solution for the biological treatment is pooled, the pH value of the solution in the apparatus is recommended to control to 4 to 5.

The biological treatment of the step is exemplified by those commonly employed in the art including microbial suspension methods such as activated sludge method, anaerobic digestion, sponge-carrier method and three-phase fluidized bed method; biofilm methods such as biological filtration, submerged bed method, fluidized bed method, trickling filter method and rotating disc method; entrapment imobilization; and the self-granulation.

In the biofilm methods, use can be made of one or more carriers selected from, for example, gravel, sand, pumice, anthracite, porous ceramics, sponge, chitosan, string-type carriers, plastics, honeycomb carriers, wavy carriers and net carriers. These carriers usable in the biological treatment widely vary from manufacturer to manufacturer. Therefore they may be arbitrary ones without restriction, so long as microorganisms can adhere thereto and thus form a biofilm.

The load in the biological treatment varies depending on the method employed. The biofilm method and the three-phase fluidized bed method are preferably performed at a BOD load of 5 kg/m$^2$.day or below, still preferably from 1 to 2 kg/m$^2$.day. The activated sludge method is preferably performed at a load of from 0.5 to 1 kg/m$^2$.day.

The activated carbon to be used in the biological activated carbon treatment may be in the form of either powders, granules or fibers. Also, a composite material consisting of activated carbon with other materials (plastics, ceramics, minerals, etc.) is usable therefor.

Examples of the activated carbon to be used in the present invention include F400 (manufactured by TOYO CALGON), Kuraray Coal KW (manufactured by Kuraray Chemical Co., Ltd.), BAC (manufactured by Kureha Chemical Industry Co., Ltd.) and FX-300 (manufactured by Toho Rayon Co., Ltd.), though the present invention is not restricted thereto.

To effect the biological treatment, use can be made of a microbial suspension method (for example, activated sludge method, aerobic digestion, sponge-carrier method) in the presence of activated carbon. When the employed activated carbon is a powdery state, the activated carbon is preferably added in an amount of from 10 to 500 g per ton of the waste solution to be treated. In the three-phase fluidized bed method of the microbial suspension with the use of granular activated carbon, the activated carbon is preferably added in an amount (in terms of bulk volume) of from 10 to 35% of the capacity of the biological treatment tank. The granular activated carbon is made to suspend and flow within the biological treatment tank.

As specific examples of the biological activated carbon treatment, a biofilm method (for example, biological filtration, submerged bed method, fluidized bed method, trickling filter method, rotating disc method) may be carried out in the presence of activated carbon.

In the biological filtration, submerged bed method, fluidized bed method and trickling filter method, granular or fibrous activated carbon is preferably used to control the amount thereof to 50 to 70% of the capacity of the biological treatment tank. In the rotating disc method, powdery activated carbon is preferable in an amount of 10 to 500 g per ton of the waste solution to be biologically treated.

Among these treatment methods, the method wherein an organism adhering to the surface of the activated carbon can be easily refreshed is preferable, since a higher treatment efficiency can be achieved thereby. More particularly, preferable examples include the fluidized bed method with the use of granular activated carbon and a method in which granular activated carbon or a carrier having activated carbon involved therein suspends and flows (for example, three-phase fluidized bed method).

In these biofilm methods, the waste solution may be passed either upwardly or downwardly.

These biological treatments are described in greater detail in, for example, "Atarashii Kassei Odei-ho (New Activated Sludge Methods)", by M. Hashimoto and R. Sudo, Snagyo-Yosui Chosa Kai (Industrial Water Research Association); and "Biseibutsu Koteika-ho ni yoru Haisui Shori (Processing of Waste Water by Microbial Immobilization Method)", ed. by R. Sudo, Sangyo-Yosui Chosa Kai.

In the present step, denitrification is effected by combining an aerobic biological treatment with an anaerobic biological treatment or an anaerobic biological treatment with an aerobic biological treatment, each in this order, to thereby eliminate nitrogen components such as nitrate ion which remain in the treated solution even after the treating in the third step.

The denitrification is effected in an anaerobic (oxygen-deficient) atmosphere. In the coexistence of a hydrogen donor, nitrate or nitrite ion is easily converted into nitrogen and thus the denitrification proceeds. When the organic matters contained in the treated solution of the third step only in an insufficient amount as the hydrogen donor to be used in the denitrification step, use can be made of additional organic compounds (for example, methanol, propanol, acetic acid). These compounds are preferably added in such an amount as to give a ratio of the TOC in the solution to be denitrified to the nitrogen in the form of nitrate of from 1.5 to 3.0, still preferably from 1.5 to 2.0.

The present inventors have studied the biological treatment step of the present invention in detail and consequently found out that the pH value in the denitrification step affects the qualities (COD, TOC) of the finally treated solution. That is, a treated solution having further reduced COD and TOC can be obtained by maintaining the pH value in the denitrification step to 7.0 to 9.0. For controlling the pH value appropriately, the submerged bed method or the fluidized bed method is preferably employed for the treatment of the denitrification step. However similar results can be achieved by controlling the pH value of the solution in the upper part of a biological filtration tower by the biofilm method.

Examples of the biological treatment to be used in the denitrification step include microbial suspension methods such as activated sludge method, three-phase fluidized bed method and sponge-carrier method; biofilm methods such as biological filtration, submerged bed method, fluidized bed method, and rotating disc method; and entrapment immobilization. Among these methods, the biofilm methods are preferable and, among these biofilm methods, submerged bed method, biological filtration with the use of a granular carrier and fluidized bed method are particularly preferable.

Although highly degradable components (for example, acetic acid) are degraded in the denitrification step, hardly degradable components and coloring components are scarcely degraded therein. These components remaining after the denitrification step are well degraded by an aerobic biological treatment and well processed by a biological activated carbon treatment. The denitrification is preferably followed by an aerobic biological treatment, still preferably an aerobic biological activated carbon treatment. During the aerobic biological treatment following the denitrification, the pH value is preferably maintained at 7.0 to 8.5.

Prior to the biological activated carbon treatment, an aerobic biological treatment without using activated carbon is preferably used, since the treating performance of the biological activated carbon treatment can be further enhanced thereby and the hardly degradable components and the coloring components can be degraded to a higher extent, thus giving a treated solution of improved qualities.

The aerobic biological treatment without using activated carbon, which is to be effected prior to the biological activated carbon treatment, may be performed either in the tank for the denitrification or in another tank. When these treatments are to be carried out in a single tank, the waste solution is denitrified by passing upwardly in the biological filtration tower, while the upper part of the tower is maintained in aerobic state by blowing air thereinto. The anaerobic region composed of a granular filter medium and a support therefor preferably occupies about 50 to 70 vol.% of the tower capacity. A carrier, to which a biofilm adheres, is preferably introduced into the aerobic (upper) region of the tower. The carrier is preferably selected from those of string-type, honeycomb, wavy and net-type for the submerged bed treatment wherein the solution in the upper part of the tower can be completely mixed therewith.

The pH value in the aerobic (upper) region of the tower is preferably maintained at from 7 to 9, still preferably from 8.0 to 8.5.

After the completion of the fourth step, phosphorus may be eliminated, if necessary.

Method for eliminating phosphorus may be arbitrarily selected from those conventionally known. Examples thereof include lime precipitation, aluminum precipitation, iron precipitation, adsorption with the use of seed crystals (phosphorous ore, bone, magnesia clinker, etc.) and ion exchange.

These methods are described in detail in "Datsuchitsu Datsurin Gijutsu to Koeiyoka (Techniques for Eliminating Nitrogen and Phosphorus and Eutrophication)" (IPC).

The treated solution of the third step can be decolored by treating with ozone, optionally under the irradiation with UV light. When the biological treatment achieves only insufficient decoloration, an ozone treatment may be employed as a post-treatment of the biological treatment.

By these treatments, not only the highly degradable components (formic acid, acetic acid, etc.) formed in the third step but also the hardly degradable components and the coloring components can be quickly degraded into carbon dioxide gas, water, etc. Thus the components serving as the COD and BOD loads and the nitrogen components in the solution can be almost completely processed and thus the treated solution becomes highly harmless. The biological treatment in the step is carried out by using the activity of an organism and, therefore, requires only an extremely low energy. Therefore, a treatment satisfying both of the requirements for a high degree of harmless and energy-saving can be performed by appropriately setting the reaction time in the catalytic wet oxidation of the third step.

Now a typical flow of the process for treating a waste solution in the fourth step of the present invention will be given.

adsorbing via a strong physical force or those adsorbing chemically.

The aqueous alkaline solution for washing is not particularly restricted but arbitrarily selected from various solutions such as aqueous solutions of sodium hydroxide, potassium hydroxide and sodium carbonate. Also, the aqueous acidic solution for washing are not particularly restricted but arbitrarily selected from various solutions such as aqueous solutions of sulfuric acid, nitric acid, hydrochloric acid and various organic acids. An appropriate washing solution may be selected depending on the matters adhered. In general, an aqueous solution of sodium hydroxide, sulfuric acid, nitric acid or hydrochloric acid is preferable.

Regarding a concentration, such a washing solution preferably contains at least 3 g/l, still preferably at least 10 g/l, of, for example, hydrogen chloride (in an aqueous solution of hydrochloric acid) or sulfuric acid (in an aqueous solution of sulfuric acid). When the concentration of hydrogen chloride or sulfuric acid is less than 3 g/l, the washing effects are seriously deteriorated. When the concentration is less than 10 g/l, the washing solution should be used in a large amount, which requires a troublesome post-washing treat-

TABLE 1

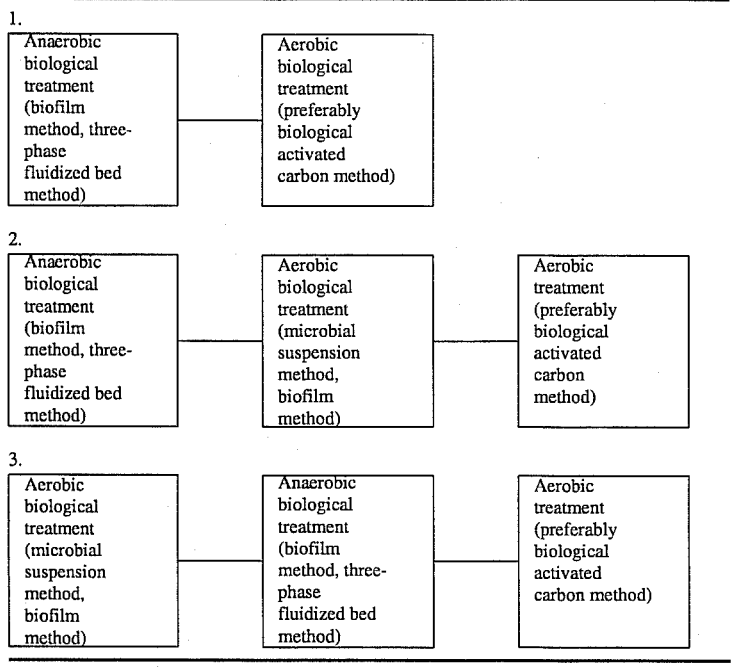

Washing of the noncatalytic wet oxidation apparatus to be used in the first step and the adsorption apparatus and the inorganic adsorbent to be used in the third step of the present invention will be described.

The noncatalytic wet oxidation apparatus used in the first step and the adsorption apparatus and the inorganic adsorbent used in the third step may be optionally washed. The timing for washing is not particularly affected by, for example, the washing method.

This washing may be performed by using, for example, water, an aqueous alkaline solution or an aqueous acidic solution. It is preferable from the viewpoint of effectiveness to use an aqueous alkaline or acidic solution therefor. This is because washing merely with water alone can remove scales adhering via weak physical force but not scales ment. Moreover, the treating temperature is necessarily elevated to a relatively high level (i.e., 100° C. or above) in order to complete the washing within a short period of time, which requires severe washing conditions (elevated pressure, etc.).

In the aqueous sulfuric acid solution, the sulfuric acid concentration is effectively regulated to lower than 700 g/l, still effectively lower than 300 g/l. When the sulfuric acid concentration is 700 g/l or above, the aqueous sulfuric acid solution becomes viscous, which makes it difficult to feed the washing solution.

When the acidic washing solution is used, a treating temperature may be controlled to 10° to 200° C. without restriction. However, the treatment is generally preferably performed at a temperature lower than 100° C., since the operation can be effected under atmospheric pressure and an improved workability can be attained at such a temperature. Also, a treating temperature is effectively 50° C. or above, since a higher treating temperature makes the treating time shorter and improves in the washing performance. It is sometimes observed that the corrosion resistance of the apparatus is deteriorated, when the treatment is effected at a high temperature and at a high concentration of hydrogen chloride (in the aqueous hydrochloric acid solution) or sulfuric acid (in the aqueous sulfuric acid solution).

When the treatment is effected at a high temperature and at a high concentration of hydrogen chloride in the aqueous hydrochloric acid solution or sulfuric acid in the aqueous sulfuric acid solution, therefore, a heavy metal ion or a heavy metal compound is effectively added to the washing solution so as to improve the corrosion resistance of the apparatus, though the present invention is not restricted thereto. Although the heavy metal ion or the heavy metal compound to be used herein is not particularly restricted, iron or copper ion or an iron or copper compound is preferably used therefor. However, from the viewpoint of the corrosion resistance of the apparatus, the treatment is also preferably effected at a temperature lower than 160° C.

Regarding the concentration of an aqueous solution of an alkali (for example, sodium hydroxide), the sodium hydroxide concentration is effectively 1 g/l or more, still effectively 10 g/l or more. When the concentration of sodium hydroxide is less than 1 g/l, the washing effects are seriously deteriorated. When the concentration of sodium hydroxide is less than 10 g/l, the washing solution should be used in a large amount, which requires a troublesome post-washing treatment. Moreover, the treating temperature is necessarily elevated to a relatively high level in order to complete the washing within a short period of time. The sodium hydroxide concentration is preferably regulated to lower than 400 g/l, still preferably lower than 300 g/l. When the sulfuric acid concentration is 400 g/l or above, the aqueous solution of sulfuric acid becomes viscous, which makes it difficult to feed the washing solution. Moreover, the corrosion resistance of the apparatus is sometimes deteriorated at such a high treating temperature.

Washing with an alkaline washing solution may be effected at an arbitrary temperature within a range of from 50° to 300° C. without restriction, though the treating temperature preferably falls within a range of from 130° to 270° C. At a lower treating temperature, the longer washing time is needed and yet the worse washing effects are achieved. Although the washing time can be shortened and better washing effects can be obtained at a high temperature, the washing treatment under such a pressure is necessarily performed to hold said waste solution in a liquid phase. Also, an excessively high treating temperature sometimes causes not only an elevated operation cost but also the deterioration of the corrosion resistance of the device.

The treating pressure at the washing step may be appropriately selected by considering the correlation with the washing temperature under such a pressure as to hold the washing solution in a liquid phase, without restriction.

In the present invention, the washing is not restricted but may be effected by either the continuous washing method with the use of a running washing solution or the batch method wherein the washing solution is pooled in a container packed with an adsorbent for a definite period of time and then withdrawn.

In the wet oxidation treatments in the first step and the third step in the process of the present invention, techniques for controlling the supply of the alkali, the oxygen-containing gas and the dilution water and techniques for controlling the temperature are not particularly restricted. Namely, these factors can be arbitrarily controlled through feedback depending on, for example, the pH value and composition of the treated solution, the composition of the exhaust gas and the treating temperature.

(Functions)

Now, the functions of the present invention will be described. However it is to be understood that these function of the present invention will be described in order to further clarify the characteristics of the present invention by highlighting the basis for the process for treating a photographic waste solution, which has been described above in detail, and not by way of limitation.

In the process for treating a photographic waste solution according to the present invention, the waste solution is highly purified and the COD components, etc. contained therein are significantly reduced by the catalytic wet oxidation in the third step. The catalyst employed therefor is of a solid having both an activity and durability under liquid phase oxidation conditions. The catalyst may be selected from, for example, titanium, iron, zirconium, manganese, cobalt, nickel, tungsten, copper, cerium, silver, platinum, rhodium, gold, iridium and ruthenium.

In the present invention, the COD components remaining after the completion of the catalytic wet oxidation are also degraded by microorganisms in the subsequent biological treatment. The biological treatment comprises a combination of an aerobic biological treatment with an anaerobic biological treatment. Also, nitrogen components mainly comprising ammonia are almost completely degraded in the biological treatment. A biological activated carbon treatment is also preferably employed, since hardly degradable components and coloring components can be degraded thereby.

As described above, the photographic waste solution according to the present invention frequently contains aluminum, phosphorus, silicon, calcium, magnesium, etc. Compounds of these elements are harmful in the catalytic wet oxidation. Namely, these compounds contained in the waste solution cause clogging of the line in, for example, the catalyst layer and deterioration of the catalyst. As a result, the catalytic wet oxidation cannot be sometimes completely performed, thus often bringing about undesirable results.

Further, a photographic waste solution often contains heavy metals such as iron and silver. In the catalytic wet oxidation, compounds of these elements similarly cause clogging of the line in, for example, the catalyst layer and deterioration of the catalyst. As a result, the catalytic wet oxidation cannot be sometimes completely performed, thus bringing about undesirable results.

Furthermore, a photographic waste solution contains halogens as one of its components. These halogens sometimes inhibit the catalytic wet oxidation and thus bring about undesirable results.

Therefore, these harmful matters and heavy metals from the waste solution are necessarily eliminated as much as possible before effecting the catalytic wet oxidation.

The main object of the above-mentioned first step and the subsequent second step of the present invention is to eliminate these harmful matters and heavy metals from the photographic waste solution.

By these treatments, harmful matters such as aluminum, phosphorus, silicon, calcium and magnesium and heavy metals such as silver and iron are converted into substances insoluble or sparingly soluble in water (for example, oxides, hydroxides, inorganic salts) to thereby form solid matters or suspended matters. Furthermore, silver, aluminum, phosphorus, silicon, etc. contained in the waste solution are thus converted into compounds insoluble or sparingly soluble in water and adsorbed by iron compounds, which are formed simultaneously and insoluble or sparingly soluble in water, thus giving solid or suspended matters.

In the first step, other contaminants in the photographic waste solution (for example, organic matters and inorganic COD components) are simultaneously oxidized and degraded into organic matters of lower molecular weight, inorganic salts, carbon dioxide, water, ash, etc. In the first step, therefore, organic matters such as chelating agents are degraded and, as a result, heavy metals and harmful matters are liberated in the form of an ion, etc. As a result, heavy metals and harmful matters, which have been dissolved in the photographic waste solution in the form of a chelate complex, etc., are converted into compounds insoluble or sparingly soluble in water and thus precipitated. Thus these heavy metals and harmful matters can be easily eliminated.

When the concentrations of the heavy metals and harmful matters to be eliminated cannot be lowered to the desired level even after the completion of the noncatalytic wet oxidation or the solid-liquid separation, it is also possible to further eliminate these components by, for example, adsorption with the use of activated carbon, inorganic adsorbents or organic polymers, electric dialysis with the use of membranes, or addition of chemicals capable of insolubilizing the substances to be eliminated.

The heavy metals and harmful matters, which have been made insoluble or sparingly soluble in water by the above-mentioned noncatalytic wet oxidation and noncatalytic wet oxidation, are precipitated. The insoluble or suspended matters thus precipitated are subjected to the solid-liquid separation by precipitation, centrifugation or filtration in the second step.

The heavy metals and harmful matters causing clogging in the line in, for example, the catalyst layer and deterioration of the catalyst are eliminated in the above-mentioned first step and the subsequent second step of the present invention. Then the waste solution is transported to the third step and subjected to catalytic wet oxidation to thereby give a treated solution in a high purity.

Following the catalytic wet oxidation, the treated solution is subjected to the adjustment of pH value, etc. to thereby give the treated solution which is most suitable for the biological treatment.

The COD components remaining in the above-mentioned treated solution are degraded by microorganisms in the subsequent biological treatment. The biological treatment comprises a combination of an aerobic biological treatment with an anaerobic biological treatment.

Because of a mixture of various waste solutions collected commercially, a photographic waste solution always suffers from changes in content of each waste solution and composition thereof. Further, a photographic waste solution contains halogen which inhibit the catalytic wet oxidation. In the third step, therefore, the composition (i.e., the content of remaining organic matters, nitrogen concentration, etc.) of the treated solution is highly changeable. In addition, a photographic waste solution is hardly degradable and, therefore, a long treating time and a high cost are required in order to completely degrade the solution by the third step. When the treating time is shortened, however, the biologically hardly degradable components remain in a larger amount and the coloration becomes more serious. To completely treat a photographic waste solution at a low cost, it is therefore required to perform a biological treatment which is highly resistant against changes in the concentration and composition of the remaining matters and capable of degrading biologically hardly degradable components and coloring components.

As the results of extensive studies, the present inventors have found out that a treatment comprising a combination of an aerobic biological treatment with an anaerobic biological treatment is effective in processing the treated solution. The inventors have further found out that a biological activated carbon treatment is particularly effective for this purpose. The biological activated carbon treatment makes it possible to decompose biologically hardly degradable components and coloring components.

The biological treatment in this step may comprise either a biological treatment without using activated carbon alone or a combination of a biological activated carbon treatment therewith. In the combined applications, the biological activated carbon treatment is preferably carried out later, though the present invention is not restricted thereto.

After the completion of the biological treatment, phosphorus may be eliminated, if necessary, by a method arbitrarily selected from the conventionally known treatments for eliminating phosphorus.

The treated solution of the third step can be degraded by treating with ozone optionally under UV irradiation. When the treated solution cannot be sufficiently decolored by the biological treatment, therefore, the ozone treatment may be effected after the biological treatment as a post-treatment.

Due to these treatments, the hardly degradable components and coloring components remaining after the third step can be quickly degraded into carbon dioxide, water, etc. As a result, the components serving as the COD and BOD loads and nitrogen components in the treated solution can be almost completely degraded and thus the treated solution becomes highly harmless.

Table 1 shows a typical flow chart of the process for treating a waste solution in the fourth step of the present invention.

The process of the present invention requires only a small plant site and a small-sized apparatus for processing waste solution. Compared with the conventional waste water processing plants (for example, one provided with devices exclusively for biological treatments and combustion), therefore, the process of the present invention, which requires only a small apparatus and simplified procedures, is advantageous from the viewpoint of the investment and maintenance of the plant and the running cost. Moreover, a photographic waste solution purified by the process of the present invention, which comprises a biological treatment effective in changes in the composition of the solution and degradation of hardly degradable matters, can be discharged as such.

To further illustrate the present invention in greater detail, and not by way of limitation, the following Examples and Comparative Examples will be given.

EXAMPLE 1

By using a noncatalytic wet oxidation apparatus 1 and a solid-liquid separator 4 shown in FIG. 1, the first step and the second step were performed continuously for 500 hours. By using the treated solution obtained after 500 hours, the contents of iron, aluminum and phosphorus in the filtrate were measured by inductively coupled radiofrequency plasma emission spectrophotometry and the concentrations were determined. Similarly, the contents of TOC, $COD_{Cr}$ and total nitrogen contents were determined and the concentrations and treatment efficiencies were determined. Now, the operating process and obtained results for each apparatus as described above will be given in detail.

Into a supply line 10, were fed a diluted photographic waste solution supplied from a waste solution-supply line 8 at a flow rate of 2 l/hr via a waste solution-supply pump 3, a 25% by weight aqueous solution of sodium hydroxide at a flow rate of 6 ml/hr under an elevated pressure of 85 kg/cm$^2$G via an alkali-supply pump 15, and air supplied from an oxygen-containing gas-supply line 9 after elevating the pressure by a compressor 5.

The air was fed in such a rate as to give an $O_2/COD_{Cr}$ ratio (oxygen in the air/chemical oxygen demand) of 1.5.

The obtained gas-liquid mixture was transported to a heat exchanger 2 via a gas-liquid mixture-supply line 10 and heated therein. The mixture was introduced into a noncatalytic wet oxidation tower 1 (empty tower) from the bottom and subjected to noncatalytic wet oxidation therein at a treating temperature of 260° C. The solution thus treated was transported to the heat exchanger 2 via a treated solution line 11, cooled therein and then fed into a gas-liquid separator 4. The space velocity of this diluted photographic waste solution was 2.0 hr$^{-1}$. In the gas-liquid separator 4, the liquid face was detected by a liquid face controller (LC) and maintained at constant level with the use of a liquid face control valve 6. At the same time, the pressure was measured and maintained at a constant level with the use of a pressure control valve 7 of a pressure controller (PC). The treated solution discharged from a treated solution-discharge line 13 was pooled in the first step treated solution tank 14. Then the solution was subjected to solid-liquid separation with a solid-liquid separator 18 and fed into the second step treated solution tank 19.

In the solid-liquid separator 18, diatomaceous earth (average particle size: about 13 μm) was added to the filtration aid by way of precoating and body feeding with the use of a filter press. The diatomaceous earth was added at a ratio of 1 kg/m$^2$ of filter area (in the case of precoating) or 1 kg/m$^3$ of the first step treated solution (in the case of body feeding).

As the solution to be treated in the above-mentioned manner, use was made of a photographic waste solution containing 500 mg/l of iron, 330 mg/l of aluminum and 150 mg/l of phosphorus and having a TOC of 16.5 g/G, a $COD_{Cr}$ of 80.0 g/l, a total nitrogen concentration of 10.2 g/G and a pH value of 9.1 which had been previously diluted 1.5-fold with pure water in a waste solution tank.

The analysis of the treated solution of the second step indicated that it contained not more than 1 mg/l of iron, 1 mg/l of aluminum and 8 mg/l of phosphorus and had a TOC concentration of 4.4 g/l, a $COD_{Cr}$ concentration of 19.8 /l and a total nitrogen concentration of 6.5 g/l. Thus the treatment efficiencies of TOC, $COD_{Cr}$ and total nitrogen were respectively 58%, 61% and 0%. The treated solution of the first step and that of the second step both had a pH value of 8.2.

Subsequently, the treated solution of the second step was subjected to catalytic wet oxidation continuously for 500 hours in the third step, i.e., by using a catalytic wet oxidation apparatus shown in FIG. 2. By using the treated solution obtained after 500 hours, the contents of iron, aluminum and phosphorus therein were measured by inductively coupled radiofrequency plasma emission spectrophotometry and the concentrations were determined. Similarly, the contents of TOC, $COD_{Cr}$ and total nitrogen were measured and the concentrations and treatment efficiencies were determined.

An adsorption tower 38 was packed with 1 l of an adsorbent comprising oxides containing titanium. A catalytic wet oxidation tower 21 was packed with 1 l of a catalyst comprising a titanium-zirconium composite oxide and ruthenium (ruthenium content: 0.8% by weight).

The operating process of this apparatus will be described in detail. Into a supply line 30, were fed the above-mentioned treated solution of the second step supplied from a second step treated solution-supply line 28 at a flow rate of 2 l/hr via a second step treated solution-supply pump 23, a 25% by weight aqueous solution of sodium hydroxide at a flow rate of 61 ml/hr under an elevated pressure of 85 kg/cm$^2$G via an alkali-supply pump 35, and air supplied from an oxygen-containing gas-supply line 23 after elevating the pressure by a compressor 5. The air was fed in such a rate as to give an $O_2/COD_{Cr}$ ratio (oxygen in the air/ chemical oxygen demand) of 1.2.

The obtained gas-liquid mixture was transported to a heat exchanger 22 via a gas-liquid mixture-supply line 30 and heated therein. The mixture was introduced into the adsorption tower 38 packed with the adsorbent from the bottom and treated therein at a treating temperature of 255° C. The treated solution thus obtained was subsequently transported to the catalytic wet oxidation tower 21 packed with the catalyst from the bottom and subjected to catalytic wet oxidation at a treating temperature of 265° C. Next, the solution thus treated was transported to the heat exchanger 22 via a treated solution line 31, cooled therein and then fed into a gas-liquid separator 24. The space velocity of the treated solution of the second step in the adsorption tower was 2.0 hr$^{-1}$. A space velocity in the catalytic wet oxidation tower was also 2.0 hr$^{-1}$. In the gas-liquid separator 24, the liquid level was detected by a liquid face controller (LC) and maintained at constant with the use of a liquid face control valve 26. At the same time, the pressure was detected and maintained at constant with the use of a pressure control valve 27 of a pressure controller (PC). The treated solution discharged through a treated solution-discharge line 33 was pooled in the second step treated solution tank 34. After the completion of the third step, the obtained treated solution contained not more than 1 mg/l of iron, not more than 1 mg/l of aluminum and 8 mg/l of phosphorus. The solution had a TOC concentration of 0.78 g/l, a $COD_{Cr}$ concentration of 2.3 g/l and a total nitrogen concentration of 0.21 g/l. Thus the treatment efficiencies of TOC, $COD_{Cr}$ and total nitrogen were respectively 82%, 88% and 97%. This treated solution had a pH value of 6.2. Accordingly, the TOC, $COD_{Cr}$ and total nitrogen treatment efficiencies calculated from the diluted photographic waste solution employed as the starting solution in this Example were respectively 95%, 92% and 97%.

In the fourth step, the treated solution of the third step was diluted 10/3 times. The obtained solution is referred to as the raw biological solution (I).

The analytical data of the raw biological solution (I) were as follows.

| | |
|---|---|
| pH | 6.2 |
| BOD | 370 mg/l |
| $COD_{Mn}$ | 80 mg/l |
| $COD_{Cr}$ | 658 mg/l |
| TOC | 221 mg/l |
| T-N | 63 mg/l |
| Chromaticity | 950. |

Figure 3:
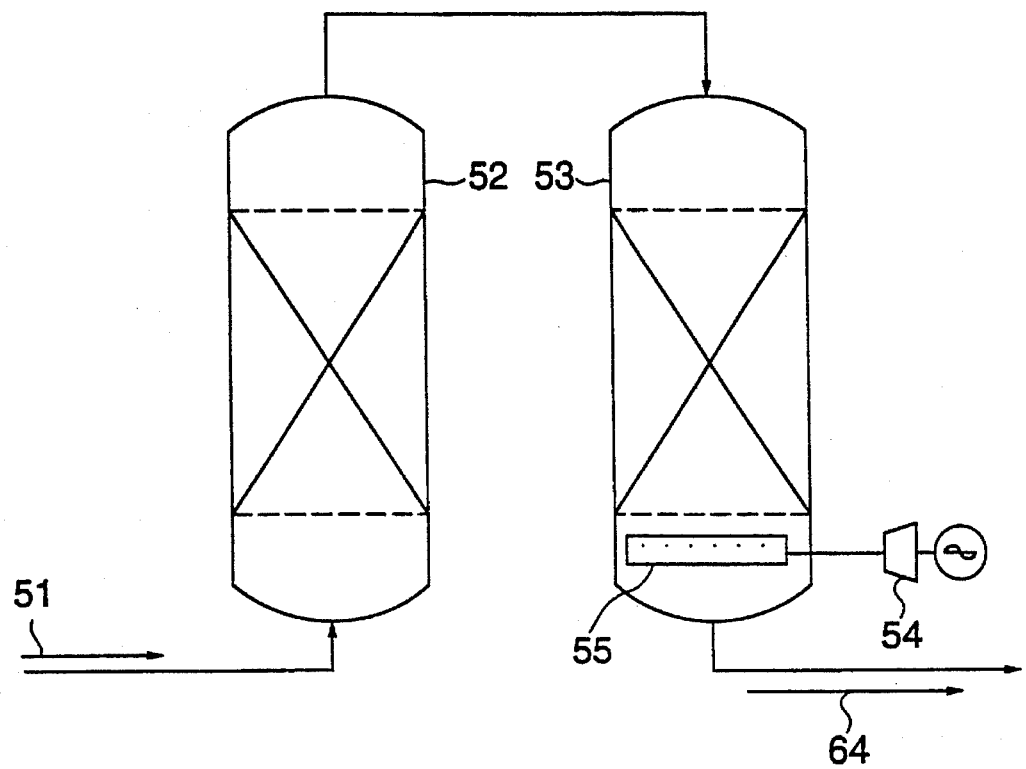
FIG. 3 shows an embodiment of the treatment apparatus to be used in the fourth step of the present invention.

The raw biological solution (I) was treated by the following two methods with the use of a biological treatment device shown in FIG. 3.

Step 4-1:

Anaerobic treatment (pH-regulated)/aerobic treatment (biological activated carbon treatment)

As shown in FIG. 3, the raw biological solution (I) 51 was treated by passing through a biological filtration tower 52, which was packed with a filter medium made of a porous ceramic and a support for supporting said filter medium, and another biological filtration tower 53, which was packed with granular activated carbon and a support for supporting said activated carbon. First, the solution was passed upwardly through the biological filtration tower 52, in which the space was maintained anaerobic. A retention time of the solution in the tower was set to 5 hours. A pH value of the solution was regulated to 8 by mechanically stirring the solution at an upper part of the tower. Subsequently, the solution discharged from the biological filtration tower 52 was passed downwardly through another biological filtration tower 53. A retention time of the solution in the tower was set to 4 hours. A space in the tower 53 was maintained aerobic by continuously supplying air from an air diffuse pipe 55 provided at a bottom of the tower. A pH value of the solution at an upper part of the tower was regulated to 7.5. After the completion of the treatment in the biological filtration tower 53, the treated solution 64 became colorless, transparent and odorless. The analytical data of this solution were as follows.

|  |  |
|---|---|
| pH | 8.0 |
| BOD | 9 mg/l |
| $COD_{Mn}$ | 7 mg/l |
| $COD_{Cr}$ | 25 mg/l |
| TOC | 5 mg/l |
| T-N | 10 mg/l |
| Chromaticity | ≦30. |

Namely, COD, BOD, TOC, T-N and chromaticity were all lowered favorably.

Step 4-2:

Anaerobic treatment (pH-unregulated)/aerobic treatment (biological activated carbon treatment)

In the apparatus shown in FIG. 3, the procedure of the above step 4-1 was repeated without regulating the pH value. A pH value of the solution at an upper part of the anaerobic treatment tower was 9.4.

After the completion of the biological treatment, the treated solution became colorless, transparent and odorless. The analytical data of this solution were as follows.

|  |  |
|---|---|
| pH | 8.0 |
| BOD | 12 mg/l |
| $COD_{Mn}$ | 15 mg/l |
| $COD_{Cr}$ | 40 mg/l |
| TOC | 10 mg/l |
| T-N | 10 mg/l |
| Chromaticity | ≦30. |

Although COD, BOD, TOC, T-N and chromaticity were all lowered favorably, these data, except the chromaticity, were higher than those of the step 4-1.

The results of the steps 4-1 and 4-2 indicate that a treated solution of better qualities can be obtained by regulating the pH value at an upper part of the anaerobic biological treatment tower.

EXAMPLE 2

The treatments of the first step and the second step in Example 1 were repeated except for the following conditions. Similar to Example 1, the noncatalytic wet oxidation apparatus 1 and the solid-liquid separator 4 shown in FIG. 1 were used and the treatments of the first step and the second step were carried out in the same manner as of Example 1 continuously for 500 hours under the following conditions. After 500 hours, the treated solution thus obtained was analyzed.

In the noncatalytic wet oxidation, a flow rate of the diluted photographic waste solution was 1.0 l/hr, a space velocity of the diluted photographic waste solution was 1.0 $hr^{-1}$, a feeding rate of the 25% by weight aqueous sodium hydroxide solution was 32 ml/hr, the $O_2/COD_{Cr}$ (oxygen in the air/chemical oxygen demand) was 2.0, the treating pressure was 75 kg/cm²G and the treating temperature was 255° C.

In the solid-liquid separation, diatomaceous earth (average particle size: about 13 μm) was added to the filtration aid at a ratio of 1 kg/m² of the filtration area in the case of precoating. In the case of body feeding, alternatively, 600 g of the above-mentioned diatomaceous earth and 400 g of zeolite A (Na) was added per m³ of the treated solution of the first step.

As the solution to be treated in the above-mentioned manner, use was made of a photographic waste solution containing 960 mg/l of iron, 11 mg/l of silver, 103 mg/l of aluminum, 391 mg/l of phosphorus, 16 mg/l of silicon, 23 mg/l of calcium and 5 mg/l of magnesium and having a TOC concentration of 13.0 g/l, a $COD_{Cr}$ concentration of 69.0 g/l, a total nitrogen concentration of 14.2 g/l and a pH value of 8.7 which had been previously diluted 2.0-fold with pure water (deionized water).

The analysis of the treated solution of the first step indicated that the solution contained not more than 1 mg/l of iron, not more than 1 mg/l of silver, not more than 1 mg/l of aluminum, 13 mg/l of phosphorus, 3 mg/l of silicon, 6 mg/l of calcium and 1 mg/l of magnesium. The treated solution of the second step contained not more than 1 mg/l of iron, not more than 1 mg/l of silver, not more than 1 mg/l of aluminum, 13 mg/l of phosphorus, 3 mg/l of silicon, not more than 1 mg/l of calcium and not more than 1 mg/l of magnesium. The solution had a TOC concentration of 2.3 g/l, a $COD_{Cr}$ concentration of 11.7 g/l and a total nitrogen concentration of 6.9 g/l. Thus the treatment efficiencies of TOC, $COD_{Cr}$ and total nitrogen were respectively 63%, 64% and 0%. The treated solutions of the first step and the second step both had a pH value of 7.6.

Figure 2:
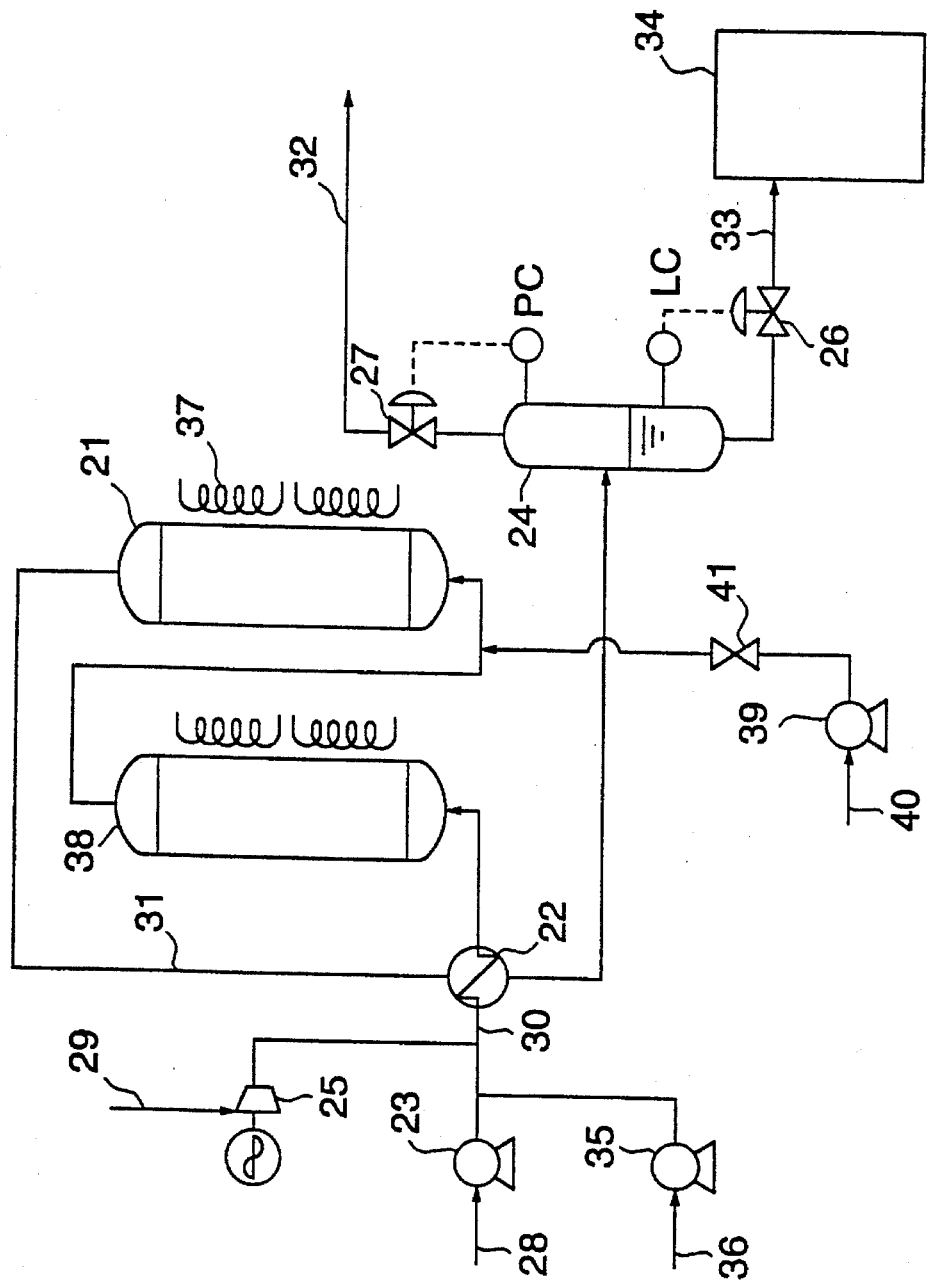
FIG. 2 shows an example of the embodiment of the treatment apparatus to be used in the third step of the present invention.

By using the catalytic wet oxidation apparatus shown in FIG. 2, the treated solution of the second step was then subjected to catalytic wet oxidation continuously for 500 hours under the following conditions in the same manner as of Example 1. Then the treated solution obtained after 500 hours was analyzed. As the catalyst, use was made of 1 l of a catalyst comprising a titanium-zirconium composite oxide and ruthenium (ruthenium content: 0.8% by weight), similar to Example 1. As the adsorbent, use was made of 1 l of an adsorbent comprising a titanium-zirconium composite oxide.

In the catalytic wet oxidation, a flow rate of the treated solution of the second step was 1.0 l/hr, a space velocity of the treated solution of the second step was 1.0 $hr^{-1}$, a flow rate of the 25% by weight aqueous sodium hydroxide solution was 30 ml/hr, the $O_2/COD_{Cr}$ (oxygen in the air/chemical oxygen demand) was 1.5, a treating pressure was 75 kg/cm²G, a treating temperature in the adsorption tower 38 was 245° C., and a treating temperature in the catalyst wet oxidation tower 21 was 255° C.

The treated solution, thus obtained, contained not more than 1 mg/l of iron, not more than 1 mg/G of silver, not more than 1 mg/l of aluminum, 11 mg/l of phosphorus, 1 mg/l of silicon, not more than 1 mg/l of calcium and not more than 1 mg/l of magnesium. The solution had a TOC concentration of 0.30 g/l, a $COD_{Cr}$ concentration of 0.80 g/l and a total nitrogen concentration of 0.13 g/l. Thus, the treatment efficiencies of TOC, $COD_{Cr}$ and total nitrogen were respectively 86%, 93% and 98%. This treated solution had a pH value of 5.7.

Accordingly, the TOC, $COD_{Cr}$ and total nitrogen treatment efficiencies calculated from the photographic waste solution employed as the starting solution in this Example 2 were respectively 95%, 97% and 98%.

The treated solution of the third step was diluted 2.5-fold in the fourth step. The obtained solution is referred to as a raw biological solution (II). The analytical data of the raw biological solution were as follows.

| | |
|---|---|
| pH | 5.7 |
| BOD | 190 mg/l |
| $COD_{Mn}$ | 70 mg/l |
| $COD_{Cr}$ | 336 mg/l |
| TOC | 126 mg/l |
| T-N | 57 mg/l |
| Chromaticity | 700. |

By using the biological treatment apparatus shown in FIG. 3, the raw biological solution (II) was treated in the following manner.
Step 4:

Anaerobic treatment (pH-unregulated)/aerobic treatment (biological activated carbon treatment)

The procedure of the step 4-1 in Example 1 was repeated without regulating a pH in the anaerobic biological treatment. A pH value of the solution at an upper part of the anaerobic biological treatment tower was 9.2.

After the completion of the biological treatment, the treated solution became colorless, transparent and odorless. The analytical data of this solution were as follows.

| | |
|---|---|
| pH | 8.0 |
| BOD | 5 mg/l |
| $COD_{Mn}$ | 8 mg/l |
| $COD_{Cr}$ | 15 mg/l |
| TOC | 5 mg/l |
| T-N | $\leq 5$ mg/l |
| Chromaticity | $\leq 30$. |

Namely, COD, BOD, TOC, T-N and chromaticity were all lowered favorably.

EXAMPLE 3

The treatments of the first step and the second step in Example 1 were repeated except for the following conditions. Similar to Example 1, the noncatalytic wet oxidation device 1 and the solid-liquid separator 18 shown in FIG. 1 were used and the treatments of the first step and the second step were carried out in the same manner as of the Example 1 continuously for 500 hours under the following conditions. After 500 hours, the treated solution thus obtained was analyzed.

In the noncatalytic wet oxidation, a flow rate of the diluted photographic waste solution was 2.0 l/hr, a space velocity of the treated waste solution was 2.0 $hr^{-1}$, a supply rate of the 25% by weight aqueous sodium hydroxide solution was 40 ml/hr, the $O_2/COD_{Cr}$ (oxygen in the air/chemical oxygen demand) was 1.2, the treating pressure was 75 $kg/cm^2G$ and the treating temperature was 230° C.

As the waste solution to be treated, use was made of a photographic waste solution as it is. The photographic waste solution contained 105 mg/l of iron, 4 mg/l of silver, 55 mg/l of phosphorus and 1 mg/l of calcium. It had a TOC of 6.7 a $COD_{Cr}$ of 36.5 g/l, a total nitrogen concentration of 6.0 g/l and a pH value of 5.9.

The analysis of the treated solution of the first step indicated that the solution contained not more than 1 mg/l of iron, not more than 1 mg/l of silver, 4 mg/G of phosphorus and not more than 1 mg/l of calcium. The solution had a TOC concentration of 3.9 g/l, a $COD_{Cr}$ concentration of 17.2 g/l and a total nitrogen concentration of 5.9 g/l. Thus, the treatment efficiencies of TOC, $COD_{Cr}$ and total nitrogen were respectively 41%, 52% and 0%. The treated solutions of the first step and the second step both had a pH value of 7.2.

By using the catalytic wet oxidation apparatus 21 shown in FIG. 2, the treated solution of the second step was then subjected to catalytic wet oxidation continuously for 500 hours under the following conditions in the same manner as of the Example 1 (the third step). Then the treated solution obtained after 500 hours was analyzed. As the catalyst, use was made of 1 l of a catalyst comprising a titanium-zirconium composite oxide and ruthenium (ruthenium content: 0.8% by weight). As an adsorbent, use was made of 1 l of an adsorbent comprising a titanium-zirconium composite oxide.

In the catalytic wet oxidation, a flow rate of the treated solution of the second step was 2.0 l/hr, a space velocity of the treated solution of the second step was 2.0 $hr^{-1}$, a feeding rate of the 25% by weight aqueous sodium hydroxide solution was 27 g/l, the $O_2/COD_{Cr}$ (oxygen in the air/ chemical oxygen demand) was 1.0, a treating pressure was 75 $kg/cm^2G$, a treating temperature in the adsorption tower was 230° C., and a treating temperature in the catalyst tower was 240° C.

The treated solution thus obtained contained not more than 1 mg/l of iron, not more than 1 mg/l of silver, 3 mg/l of phosphorus and not more than 1 mg/l of calcium. The solution had a TOC concentration of 1.45 g/l, a $COD_{Cr}$ concentration of 4.1 g/l and a total nitrogen concentration of 0.18 g/l. Thus, the treatment efficiencies of TOC, $COD_{Cr}$ and total nitrogen were respectively 62%, 76% and 97%. This treated solution had a pH value of 6.0.

Accordingly, the TOC, $COD_{Cr}$ and total nitrogen treatment efficiencies calculated from the photographic waste solution employed as the starting solution in this Example were respectively 77%, 88% and 97%.

The treated solution of the third step was diluted 5-fold in the fourth step. The obtained solution is referred to as the raw biological solution (III).

The analytical data of the raw biological solution (III) were as follows.

| | |
|---|---|
| pH | 6.0 |
| BOD | 430 mg/l |
| $COD_{Mn}$ | 85 mg/l |
| $COD_{Cr}$ | 837 mg/l |
| TOC | 279 mg/l |
| T-N | 39 mg/l |
| Chromaticity | 1400. |

Figure 4:
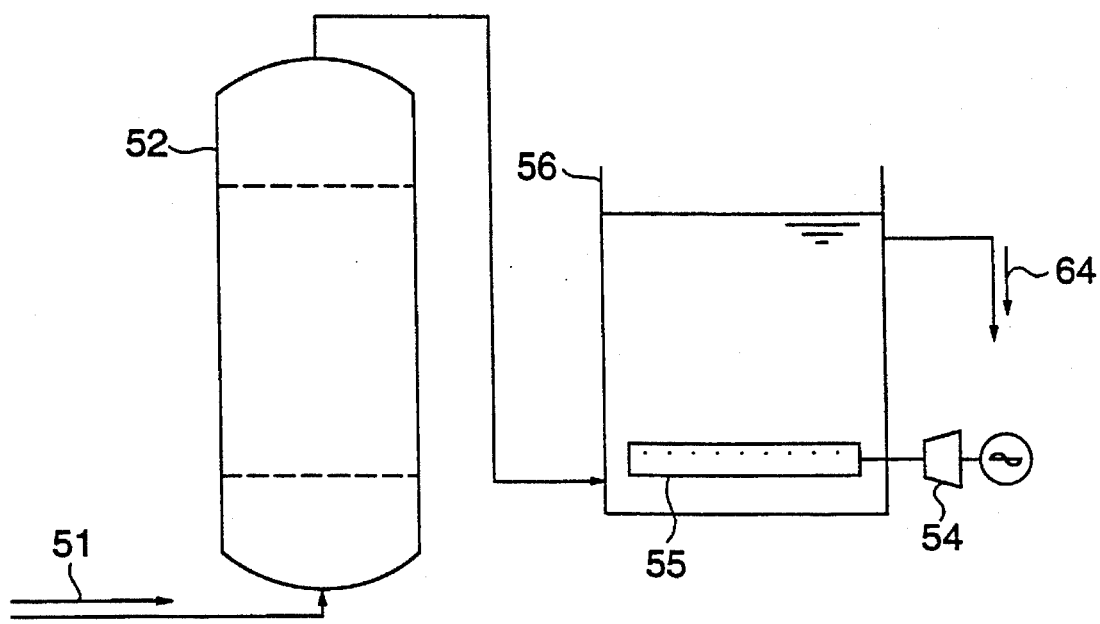
FIG. 4 shows another embodiment of the treatment apparatus to be used in the fourth step of the present invention.

By using the biological treatment apparatus shown in FIG. 4, the raw biological solution (III) was treated by the following 4 methods.

Step 4-1:

Anaerobic treatment/aerobic treatment (biological treatment without using activated carbon)

As shown in FIG. 4, the raw biological solution (III) was passed through a biological filtration tower 52 (FIG. 3), which was packed with a filter medium made of a porous ceramic and a support for supporting said filter medium, and a biological treatment tank 56 having a biological catalyst of string-type immersed therein. First, the solution was passed upwardly through the biological filtration tower 52, in which a space was maintained anaerobic. A retention time of the solution in the tower was set to 5 hours. Subsequently, the solution discharged from the biological filtration tower 52 was continuously fed into the biological treatment tank 56. A retention time of the solution in this tank was set to 4 hours. A space in the biological treatment tank 56 was maintained aerobic by continuously supplying air from an air diffuse pipe provided at a bottom of the tank. A pH value of the solution in the biological treatment tank 56 was regulated to 7.5. After the completion of the treatment in the biological treatment tank 56, the treated solution 64 became yellow, transparent and odorless. The analytical data of this solution were as follows.

| | |
|---|---|
| pH | 7.5 |
| BOD | 20 mg/l |
| $COD_{Mn}$ | 50 mg/l |
| $COD_{Cr}$ | 125 mg/l |
| TOC | 50 mg/l |
| T-N | 10 mg/l |
| Chromaticity | 1200. |

Although T-N and BOD were lowered favorably, the chromaticity remained rather unchanged.

Step 4-2:

Anaerobic treatment/aerobic treatment (biological activated carbon treatment)

The raw biological solution (III) 51 was passed through a biological treatment apparatus shown in FIG. 3 consisting of a biological filtration tower 52, which was packed with a filter medium made of a porous ceramic and a support for supporting this filter medium, and another biological filtration tank 53 which was packed with granular activated carbon and a support for supporting this activated carbon. The raw solution 51 was passed upwardly through the biological filtration tower 52, in which a space was maintained anaerobic. A retention time of the solution in the tower 52 was set to 5 hours. Subsequently, the solution discharged from the biological filtration tower 52 was passed downwardly through the biological filtration tower 53. A retention time of the solution in this tower was set to 4 hours. A space in the biological filtration tank 53 was maintained aerobic by continuously supplying air from an air diffuse pipe 55 provided at the bottom of the tower. A pH value of the solution in an upper part of the tower was regulated to 7.5. After passing through the biological filtration tower 53, the treated solution 64 became almost colorless, transparent and odorless. The analytical data of this solution were as follows.

| | |
|---|---|
| pH | 8.0 |
| BOD | 8 mg/l |
| $COD_{Mn}$ | 20 mg/l |
| $COD_{Cr}$ | 35 mg/l |
| TOC | 10 mg/l |
| T-N | $\leq 5$ mg/l |
| Chromaticity | 40. |

Thus, COD, BOD, TOC, T-N and chromaticity were all lowered favorably.

Step 4-3:

Aerobic treatment (biological treatment without using activated carbon)/anaerobic treatment/aerobic treatment (biological activated carbon treatment)

Figure 5:
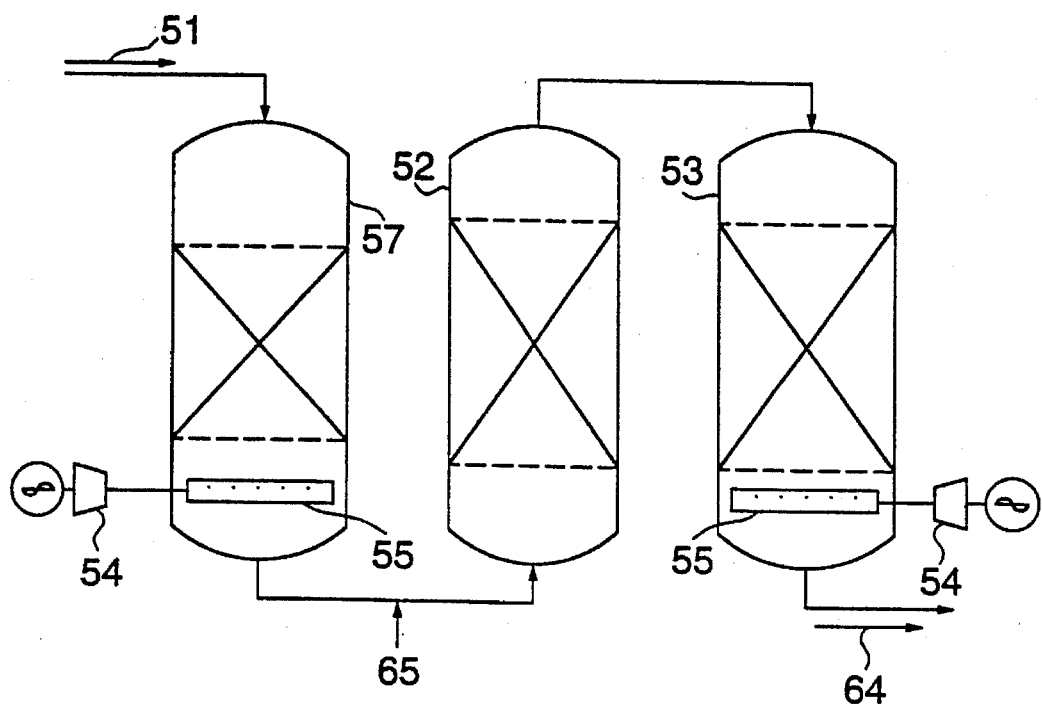
FIG. 5 shows still another embodiment of the treatment apparatus to be used in the fourth step of the present invention.

The raw biological solution (III) 51 was treated by passing through a biological treatment apparatus shown in FIG. 5.

The raw solution was passed through biological filtration towers 57 and 52, each packed with a filter medium made of a porous ceramic and a support for supporting this filter medium, and another biological filtration tank 53 which was packed with granular activated carbon and a support for supporting this activated carbon. First, the raw biological solution (III) was passed downwardly through the biological filtration tower 57. A space in the biological filtration tower 53 was maintained aerobic by continuously supplying air from an air diffuse pipe 55 provided at a bottom of the tower. A pH value of the solution in an upper part of the tower was regulated to 7.5. A retention time of the solution in the tower was set to 3 hours. Subsequently, to the solution discharged from the biological filtration tower 57 was added methanol 65 in such an amount as to correspond to a TOC concentration of 60 ppm. Then the solution was passed upwardly through the biological filtration tower 52 which was maintained anaerobic. A retention time of the solution in this tower was set to 4 hours. Further, the solution discharged from the biological filtration tower 52 was passed downwardly thorough the biological filtration tower 53. A retention time of the solution in this tower was set to 2 hours. A space in the biological filtration tank 53 was maintained aerobic by continuously supplying air from an air diffuse pipe 55 provided at a bottom of the tower. A pH value of the solution at an upper part of the tower was regulated to 7.5. After passing through the biological filtration tower 53, the treated solution became colorless, transparent and odorless. The analytical data of this solution were as follows.

| | |
|---|---|
| pH | 8.1 |
| BOD | $\leq 5$ mg/l |
| $COD_{Mn}$ | 5 mg/l |
| $COD_{Cr}$ | 10 mg/l |
| TOC | $\leq 5$ mg/l |
| T-N | $\leq 5$ mg/l |
| Chromaticity | $\leq 30$. |

Thus COD, BOD, TOC, T-N and chromaticity were all lowered very favorably.

Step 4-4:

Anaerobic treatment/aerobic treatment (biological treatment without using activated carbon)/aerobic treatment (biological activated carbon treatment; biological filtration)

Figure 6:
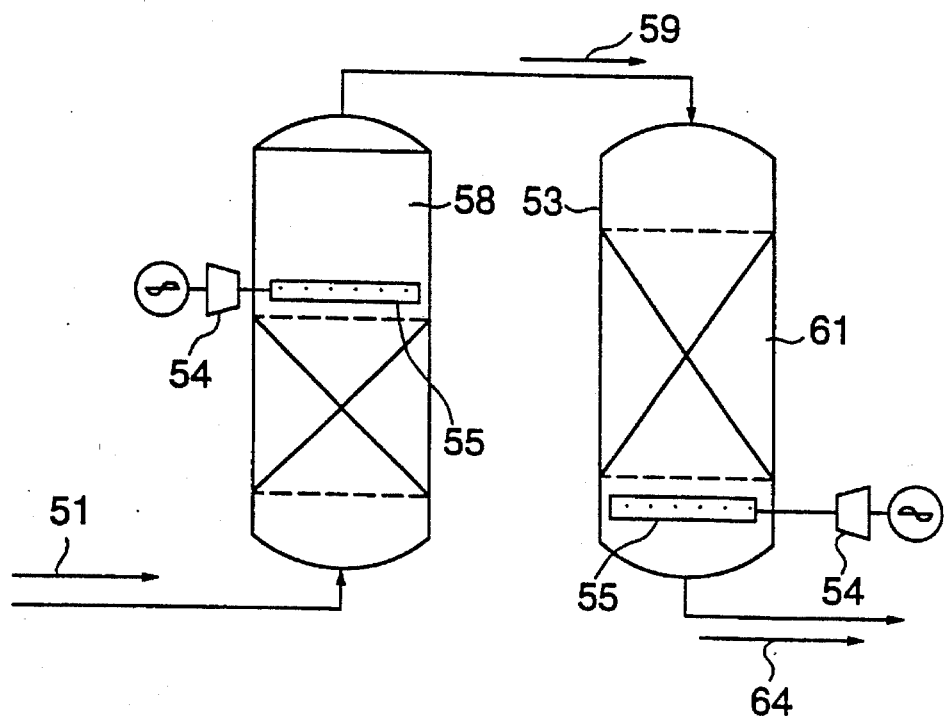
FIG. 6 shows further the embodiment of the treatment apparatus to be used in the fourth step of the present invention.

The raw biological solution (III) 51 was treated by passing through a biological treatment apparatus shown in FIG. 6.

The raw solution was passed through a biological treatment tower 58, which was packed with a filter medium made of a porous ceramic and a support for supporting this filter medium in such a manner as to occupy about 60% of the capacity of the tower, had a biological carrier of string-type immersed in the solution at an upper part of the tower and was maintained aerobic by continuously supplying air from an air diffuse pipe 55 provided at a bottom of the tower, and another biological filtration tank 53 which was packed with filter medium 61 made of granular activated carbon and a support for supporting said activated carbon. The raw biological solution (III) was passed upwardly through the biological treatment tower 58. A pH value of the solution in the upper part of the tower was regulated to 8. A retention time of the solution in the tower 58 was set to 6 hours. Subsequently, the solution 59 discharged from the biological treatment tower 58 was passed downwardly through the biological filtration tower 53. A retention time of the solution in this tower was set to 3 hours. The biological filtration tower 53 was maintained aerobic by continuously supplying air from an air diffuse pipe 55 provided at a bottom of the tower. After passing through the biological filtration tower 53, the treated solution 64 became colorless, transparent and odorless. The analytical data of this solution were as follows.

| | |
|---|---|
| pH | 7.8 |
| BOD | ≦5 mg/l |
| $COD_{Mn}$ | 10 mg/l |
| $COD_{Cr}$ | 15 mg/l |
| TOC | ≦5 mg/l |
| T-N | 5 mg/l |
| Chromaticity | ≦30. |

Thus COD, BOD, TOC, T-N and chromaticity were all lowered very well.

Step 4-5:

Anaerobic treatment/aerobic treatment (biological activated carbon treatment)/aerobic treatment (biological treatment without using activated carbon).

The treated solution of the step 4-2 of Example 3 was treated by passing downwardly through a biological filtration tower 53 packed with a filter medium made of a porous ceramic and a support for supporting this filter medium. The biological filtration tower 53 was maintained aerobic by continuously supplying air from an air diffuse pipe 55 provided at a bottom of the tower. A retention time of the solution in the tower was set to 3 hours. After passing through the biological filtration tower, the treated solution 64 became almost colorless, transparent and odorless. The analytical data of this solution were as follows.

| | |
|---|---|
| pH | 8.1 |
| BOD | ≦8 mg/l |
| $COD_{Mn}$ | 15 mg/l |
| $COD_{Cr}$ | 29 mg/l |
| TOC | ≦9 mg/l |
| T-N | 5 mg/l |
| Chromaticity | 40. |

Although COD and TOC of the treated solution of the step 4-2 were somewhat lowered, BOD and chromaticity remained unchanged.

Step 4-6:

Anaerobic treatment/aerobic treatment (biological treatment without using activated carbon)/aerobic treatment (biological activated carbon treatment; fluidized bed method)

Figure 7:
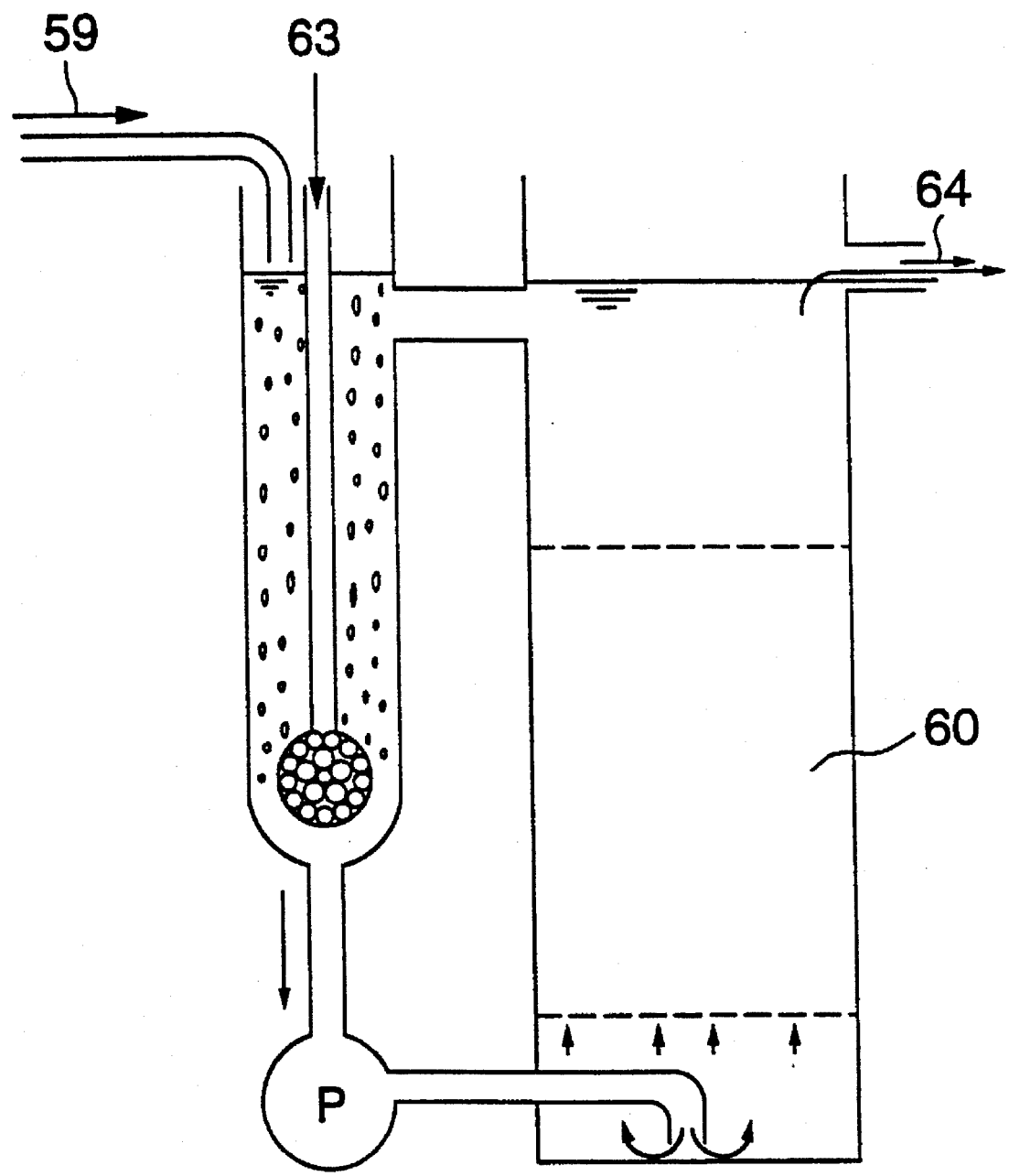
FIG. 7 shows still further an example of the fluidized bed to be used in the fourth step of the present invention.

The treated solution of the step 4-4 of Example 3 was treated in the same manner as of the step 4-4 but effecting the biological activated carbon treatment by the fluidized bed method shown in FIG. 7 as a substitute for the biological filtration method employed in the step 4-4.

The fluidized bed 60 consisted of granular activated carbon and a support for supporting the activated carbon. A flow rate of the treated solution was set by pump P in such a manner as to adjust an expanded rate of the bed to double. A retention time of the solution was set to 2 hours. The fluidized bed 60 was maintained aerobic by continuously supplying air 63 from an air diffuse pipe provided on the side pipe. After passing through the fluidized bed, the treated solution 64 became colorless, transparent and odorless. The analytical data of this solution were as follows.

| | |
|---|---|
| pH | 7.7 |
| BOD | ≦5 mg/l |
| $COD_{Mn}$ | 5 mg/l |
| $COD_{Cr}$ | 10 mg/l |
| TOC | ≦5 mg/l |
| T-N | 5 mg/l |
| Chromaticity | ≦30. |

These results indicate that, in the anaerobic treatment/aerobic biological treatment, better processing effects can be obtained by using activated carbon in the aerobic biological treatment and further improved effects can be achieved by performing a biological treatment without using activated carbon prior to the biological activated carbon treatment, i.e., sequential treatments comprising anaerobic biological treatment/aerobic biological treatment (biological treatment without using activated carbon)/aerobic biological treatment (biological activated carbon treatment). Also, excellent processing effects can be achieved by performing an aerobic biological treatment without activated carbon prior to the anaerobic biological treatment, i.e., sequential treatments comprising aerobic biological treatment (biological treatment without using activated carbon)/anaerobic biological treatment/aerobic biological treatment (biological activated carbon treatment).

It is also found out that the fluidized bed method is superior as a biological activated carbon treatment to the biological filtration method in both terms of treatment efficiency and the qualities of the treated solution.

EXAMPLE 4

The same photographic waste solution as employed in Example 2 was similarly diluted 2.0-fold with pure water (deionized water) and used in the subsequent tests.

The noncatalytic wet oxidation in the first step was performed under the same conditions as those employed in Example 2 except varying the amount of the 25% by weight aqueous sodium hydroxide solution. By controlling the amount of the solution supplied from the alkali-supply pump 15 shown in FIG. 1, the addition level of sodium hydroxide was varied so as to regulate the pH value of the treated solution to 10.0, 8.5, 7.2, 6.0 and 4.0 and then the treatments of the test levels Nos. 1 to 5 were performed respectively.

These treated solutions of 5 levels were each subjected to solid-liquid separation under the same method as those employed in Example 2. Then the iron and aluminum remaining in the treated solution were analyzed.

Table 1 shows the results.

TABLE 1

| | pH of Treated Solution | Remaining Fe (ppm) | Remaining Al (ppm) |
|---|---|---|---|
| Test No. 1 | 10.0 | ≦1 | 15 |
| No. 2 | 8.5 | ≦1 | 5 |
| No. 3 | 7.2 | ≦1 | ≦1 |
| No. 4 | 6.0 | 2 | ≦1 |
| No. 5 | 4.0 | 10 | 12 |

As shown above, high elimination efficiencies (higher than 95%, based on the total amount of iron or aluminum in the starting waste solution) were achieved at each level. It is found out that particularly high elimination efficiencies can be achieved at pH 6 to 8.5.

EXAMPLE 5

The treated solution of the second step obtained in Example 2 was used in the following tests. In the third step, the procedure was performed under the same conditions as those employed in Example 2 except varying the amount of the 25% by weight aqueous sodium hydroxide solution. By controlling the amount of the solution supplied from the alkali-supply pump, the addition level of sodium hydroxide was varies so as to regulate the pH value of the treated solution to 8.0, 7.0, 6.2, 5.5 and 4.0 and then the treatments of the test levels Nos. 6 to 10 were performed respectively.

These treated solutions of 5 levels were each subjected to a biological treatment under the same conditions as those employed in the fourth step of Example 2. Then $COD_{Cr}$ and T-N of the treated solution were determined.

TABLE 2

| Item | pH | | $COD_{Cr}$ (ppm) | | T-N (ppm) | |
|---|---|---|---|---|---|---|
| Step | 3 | 4 | 3 | 4 | 3 | 4 |
| Test No. 6 | 8.0 | 8.0 | 1,970 | 20 | 630 | 83 |
| No. 7 | 7.0 | 8.1 | 1,690 | 10 | 261 | 18 |
| No. 8 | 6.2 | 7.8 | 1,210 | 18 | 179 | 0 |
| No. 9 | 5.5 | 7.7 | 780 | 30 | 123 | 0 |
| No. 10 | 4.0 | 7.8 | 610 | 65 | 144 | 20 |

As shown above, good results are obtained after the fourth step regarding both of $COD_{Cr}$ and T-N at each level. In particular, the solutions treated at pH 5.5 to 7.0 showed excellent qualities ($COD_{Cr}$ and T-N).

EXAMPLE 6

The treated solution of the second step obtained in Example 2 was used in the following tests. In the third step, the procedure was performed under the same conditions as those employed in Example 2 except varying the temperature and the $O_2/COD_{Cr}$ (oxygen in the air/chemical oxygen demand) ratio.

The temperature and the $O_2/COD_{Cr}$ ratio were varied as specified in Table 3 and thus the treatments at test levels Nos. 11 to 15 were performed respectively. After the completion of the treatment, $COD_{Cr}$ of each treated solution was measured.

These treated solutions of 5 levels were each subjected to a biological treatment under the same conditions as those employed in the fourth step of Example 2. Then $COD_{Cr}$ of the treated solution was determined.

TABLE 3

| | Temp. (°C.) | $O_2/COD_{Cr}$ | $COD_{Cr}$ (ppm) | |
|---|---|---|---|---|
| | | | After step 3 | After step 4 |
| Test No. 11 | 220 | 3.0 | 1,010 | 63 |
| No. 12 | 230 | 2.0 | 820 | 22 |
| No. 13 | 255 | 1.5 | 790 | 20 |
| No. 14 | 280 | 1.0 | 810 | 19 |
| No. 15 | 290 | 0.8 | 1,120 | 74 |

As shown above, good processing results were obtained after the fourth step at each level. At a temperature lower than 220° C., however, the treatment efficiency was lowered even though the $O_2/COD_{Cr}$ ratio was elevated. At a temperature exceeding 290° C., on the other hand, the qualities of the treated solution were rapidly deteriorated even by slightly lowering the $O_2/COD_{Cr}$ ratio. Thus it can be understood that a temperature range of from 230° to 280° C. and a $O_2/COD_{Cr}$ ratio range of from 1.0 to 2.0 are preferable, since stable performance can be achieved without unnecessarily elevating the treating temperature or the $O_2/COD_{Cr}$ ratio and thus economical waste can be avoided under these conditions.

Comparative Example 1

The treatment was performed in the same manner as of Example 1 except the following points. That is to say, the noncatalytic wet oxidation and solid-liquid separation effected in Example 1 were omitted. As a substitute therefor, the diluted photographic waste solution used in Example 1 was directly treated with the use of a catalytic wet oxidation shown in FIG. 2. The same treatment conditions as those employed in the catalytic wet oxidation of Example 1 were used except controlling the $O_2/COD_{Cr}$ ratio (oxygen in the air/chemical oxygen demand) to 1.5 and feeding the alkali at a rate of 147 ml/l.

After about 150 hours, consequently, the clogging of the adsorption tower made it impossible to continue the treatment. Accordingly, the biological treatment in the fourth step could not be performed.

Comparative Example 2

The treatment was performed in the same manner as of Example 1 except the following points. By using the wet oxidation apparatus shown in FIG. 2, the tower, which was employed as an adsorption tower 38 in Example 1, was used as a noncatalytic wet oxidation tower (empty tower) in the continuous noncatalytic wet oxidation and catalytic wet oxidation apparatus. Further, the solid-liquid separation of the second step, which should be effected in the present invention, was omitted. The adsorption in the adsorption tower, which was effected in the present invention, was also omitted, thus performing the treatment continuously. The photographic waste solution employed herein was the diluted photographic waste solution of Example 1. The treatment conditions were as follows.

In common to the noncatalytic wet oxidation and the catalytic wet oxidation, a flow rate of the photographic waste solution was 2.0 l/hr, the $O_2/COD_{Cr}$ (oxygen in the air/ chemical demand) ratio was 1.5 and a treating pressure was 85 kg/cm²G. In the noncatalytic wet oxidation, a space velocity of the diluted photographic waste solution was 2.0 hr⁻¹ and a treating temperature was 260° C. In the catalytic wet oxidation, a space velocity was 2.0 hr⁻¹ and a treating temperature was 265° C. As the catalyst, use was made of 1 l of a catalyst comprising a titanium-zirconium composite oxide and ruthenium (ruthenium content: 0.8% by weight). As the alkali, 25% by weight aqueous sodium hydroxide solution was fed at a rate of 86 ml/l by using an alkali-supply pump 35. Also, said solution was supplied at a rate of 61 ml/l by opening the valve 41 and using an alkali-supply pump 39.

After about 200 hours, consequently, the clogging of the catalytic wet oxidation tower made it impossible to continue the treatment. Accordingly, the biological treatment in the fourth step could not be performed.

Comparative Example 3:

Treatment of raw solution (III) for biological treatment via anaerobic treatment alone In the biological treatment apparatus shown in FIG. 4, the biological filtration tower 52 alone was used. The raw biological solution (III) (obtained by diluting 5-fold the waste solution of the third step in Example 3) was treated by passing through the biological filtration tower 52 which was packed with a filter medium made of a porous ceramic and a support for supporting said filter medium and maintained anaerobic. The solution was passed upwardly through the biological filtration tower 52. A retention time of the solution in the tower was set to 9 hours. After passing through the biological filtration tower 52, the treated solution became yellow, transparent and odorless. The analytical data of this solution were as follows.

| | |
|---|---|
| pH | 9.2 |
| BOD | 320 mg/l |
| $COD_{Mn}$ | 75 mg/l |
| $COD_{Cr}$ | 730 mg/l |
| TOC | 210 mg/l |
| T-N | $\leq 10$ mg/l |
| Chromaticity | 1300. |

Although only T-N was lowered well, COD, BOD, TOC and chromaticity remained rather unchanged. Comparative Example 4:

Treatment of raw solution (III) for biological treatment via aerobic treatment alone In the biological treatment apparatus shown in FIG. 3, the biological filtration tower 53 alone was used. The raw biological solution (III) (obtained by diluting 5-fold the waste solution of the third step in Example 3) was treated by passing downwardly through the biological filtration tower 53 which was packed with a filter medium made of a porous ceramic and a support for supporting said filter medium. A retention time of the solution in the tower was set to 9 hours and a pH value at an upper part of the tower was regulated not to exceed 7. A space in the tower was maintained aerobic by continuously supplying air from an air diffuse pipe 55 provided on a bottom of the tower. After passing through the treatment tower, the treated solution became yellow, transparent and odorless. The analytical data of this solution were as follows.

| | |
|---|---|
| pH | 7.8 |
| BOD | 96 mg/l |
| $COD_{Mn}$ | 55 mg/l |
| $COD_{Cr}$ | 190 mg/l |
| TOC | 60 mg/l |
| T-N | 34 mg/l |
| Chromaticity | 1250. |

Although BOD, TOC and COD were somewhat lowered, T-N and chromaticity remained rather unchanged.

As shown in the Comparative Examples 3 and 4, the solution obtained after the catalytic wet oxidation could not be favorably treated by using either the anaerobic biological treatment or the aerobic biological treatment alone.

While the invention has been described in detail and with reference to specific embodiments thereof, it will be apparent to one skilled in the art that various changes and modifications can be made therein without departing from the spirits and scope thereof.

What is claimed is:

1. A process for treating a photographic waste solution which comprises purifying thereof by successively performing the following steps;

(i) a first step for subjecting the photographic waste solution to noncatalytic wet oxidation at a temperature of from 140° C. up to 370° C. under a pressure as to hold said waste solution in a liquid phase while supplying an oxygen-containing gas thereto;

(ii) a second step for eliminating solid matters and/or suspended matters formed in the first step from the treated solution of the first step;

(iii) a third step for subjecting the treated solution of the second step to catalytic wet oxidation at a temperature of from 140° C. up to 370° C. under a pressure as to hold said waste solution in a liquid phase while supplying an oxygen-containing gas thereto; and (iv) a fourth step for subjecting the treated solution of the third step to a biological treatment comprising a combination of an aerobic biological treatment with an anaerobic biological treatment.

2. The process for treating a photographic waste solution as claimed in claim 1, wherein the second step (ii) is a filtration using with a filtration aid.

3. The process for treating a photographic waste solution as claimed in claim 1, wherein, in the third step, an adsorbent is provided before effecting the catalytic wet oxidation and adsorption is effected with use of said adsorbent followed by the catalytic wet oxidation.

4. The process for treating a photographic waste solution as claimed in claim 1, wherein, in the fourth step (iv), the anaerobic biological treatment is first effected and then the aerobic biological treatment is effected.

5. The process for treating a photographic waste solution as claimed in claim 4, wherein the aerobic biological treatment following the anaerobic biological treatment is effected in the presence of activated carbon.

6. The process for treating a photographic waste solution as claimed in claim 4, wherein an aerobic biological treatment is effected before the anaerobic biological treatment.

7. The process for treating a photographic waste solution as claimed in claim 4, wherein the aerobic biological treatment following the anaerobic biological treatment comprises in an order of an aerobic biological treatment which is effected without using any activated carbon and another aerobic biological treatment which is effected in the presence of activated carbon.

8. The process for treating a photographic waste solution according to claim 1, wherein a pH value of the treated solution in the first step (i) ranges from 4 to 10.

9. The process for treating a photographic waste solution according to claim 1, wherein a pH value of the treated solution in the third step (iii) ranges from 4 to 8.

10. The process for treating a photographic waste solution according to claim 1, wherein in the third step (iii) an oxygen-containing gas is supplied in an amount of 0.5 to 3 times more than an amount of oxygen theoretically required for completely degrading inorganic and organic matters contained in the waste solution.

11. The process for treating a photographic waste solution according to claim 3, wherein the adsorbent is made of titanium, zirconium and iron oxides.

12. The process for treating a photographic waste solution according to claim 1, wherein a pH value in the anaerobic biological treatment in step (iv) ranges from 7 to 9.

13. The process for treating a photographic waste solution according to claim 1, wherein iron compounds are added to noncatalytic wet oxidation in the first step (i).

\* \* \* \* \*